(12) United States Patent
Yurchenko et al.

(10) Patent No.: US 9,444,738 B2
(45) Date of Patent: Sep. 13, 2016

(54) SYSTEM AND METHOD FOR MONITORING THE VOLUME OF CALLS CARRIED BY A VOICE OVER INTERNET PROTOCOL TELEPHONE SYSTEM

(75) Inventors: Vitaliy Yurchenko, Newton, MA (US); Hwan Tang, Lexington, MA (US)

(73) Assignee: IBASIS, INC., Lexington, MA (US)

( * ) Notice: Subject to any disclaimer, the term of this patent is extended or adjusted under 35 U.S.C. 154(b) by 0 days.

(21) Appl. No.: 12/212,349

(22) Filed: Sep. 17, 2008

(65) Prior Publication Data
US 2009/0010168 A1 Jan. 8, 2009

Related U.S. Application Data

(63) Continuation-in-part of application No. 10/094,671, filed on Mar. 7, 2002, now Pat. No. 7,391,731, and a continuation-in-part of application No. 10/646,687, filed on Aug. 25, 2003, now Pat. No. 7,577,131, which is a continuation-in-part of application No. 10/298,208, filed on Nov. 18, 2002, now Pat. No. 7,529,225.

(60) Provisional application No. 60/331,479, filed on Nov. 16, 2001.

(51) Int. Cl.
| *H04L 12/721* | (2013.01) |
| *H04L 12/801* | (2013.01) |
| *H04L 12/66* | (2006.01) |
| *H04L 12/701* | (2013.01) |
| *H04L 12/729* | (2013.01) |
| *H04L 12/707* | (2013.01) |
| *H04L 12/725* | (2013.01) |
| *H04L 12/803* | (2013.01) |

(52) U.S. Cl.
CPC ............... *H04L 47/10* (2013.01); *H04L 12/66* (2013.01); *H04L 45/00* (2013.01); *H04L 45/125* (2013.01); *H04L 45/22* (2013.01); *H04L 45/3065* (2013.01); *H04L 45/70* (2013.01); *H04L 47/11* (2013.01); *H04L 47/122* (2013.01)

(58) Field of Classification Search
USPC ........................ 370/229–235, 252, 351–360, 370/395.1–401, 237; 379/111–114.08, 379/221.01, 221.03, 221.04, 221.14, 379/265.11, 265.13, 266.01, 266.02, 379/266.03, 307, 309
See application file for complete search history.

(56) References Cited

U.S. PATENT DOCUMENTS

| 5,359,649 | A | * | 10/1994 | Rosu et al. | ............... 379/221.07 |
| 5,802,162 | A | * | 9/1998 | Beltrano | ................. H04M 3/22 370/362 |
| 6,118,866 | A | * | 9/2000 | Shtivelman | .................... 379/309 |
| 6,185,601 | B1 | * | 2/2001 | Wolff | ............................. 709/203 |
| 6,253,207 | B1 | * | 6/2001 | Malek | ...................... H04L 29/06 |
| 6,282,192 | B1 | * | 8/2001 | Murphy et al. | ............... 370/352 |
| 6,366,668 | B1 | * | 4/2002 | Borst et al. | ............. 379/266.04 |

(Continued)

*Primary Examiner* — Michael Thier
*Assistant Examiner* — Prince A Mensah
(74) *Attorney, Agent, or Firm* — Nixon & Vanderhye P.C.

(57) ABSTRACT

A method and a system for controlling the load of calls carried by a voice over Internet protocol telephone system attempts to reduce or eliminate the overloading of individual trunk groups and/or destination gateways. The system obtains information relating to a plurality of calls in the system, and analyzes the call information to determine if certain trunk groups or destination gateways are overloaded. If so, the system issues commands so that additional calls are diverted away from the overloaded trunk group or destination gateway.

23 Claims, 17 Drawing Sheets

(56) References Cited

U.S. PATENT DOCUMENTS

| | | |
|---|---|---|
| 6,510,219 B1 * | 1/2003 | Wellard et al. ......... 379/221.01 |
| 6,570,855 B1 * | 5/2003 | Kung et al. ................... 370/237 |
| 6,665,293 B2 * | 12/2003 | Thornton et al. ............. 370/352 |
| 6,738,824 B1 * | 5/2004 | Blair ............................ 709/238 |
| 6,744,768 B2 * | 6/2004 | Vikberg et al. .......... 370/395.21 |
| 6,795,867 B1 * | 9/2004 | Ma et al. ...................... 709/240 |
| 6,904,017 B1 * | 6/2005 | Meempat et al. ............ 370/238 |
| 7,209,473 B1 * | 4/2007 | Mohaban et al. ............ 370/352 |
| 2001/0038623 A1 * | 11/2001 | Miloslavsky ................. 370/352 |
| 2002/0172347 A1 * | 11/2002 | Elsey ....................... 379/221.01 |
| 2003/0231595 A1 * | 12/2003 | Zino et al. .................... 370/238 |

* cited by examiner

GATEWAYS

| | A | B | C | D | E | F | G | H | I | J |
|---|---|---|---|---|---|---|---|---|---|---|
| A | X | 1.3 | 2 | 1.8 | 1 | 2 | 2.2 | 3 | 1.7 | 8 |
| B | 0.9 | X | 3 | 1 | 1.6 | 7 | 1 | X | 1.3 | 2 |
| C | X | 2 | X | 2 | X | 1.7 | 1.8 | 6 | 5 | 5 |
| D | X | X | X | X | X | X | 1.2 | 1.8 | 3 | 2 |
| E | 1.6 | 1.8 | 2 | 3 | X | 7 | 1 | 2.2 | 3 | 1 |
| F | X | 2 | 3 | 1 | 1.1 | X | 1.1 | X | X | X |
| G | 2.2 | 2.2 | 2.8 | 2.1 | 3 | X | X | X | X | X |
| H | 1.4 | 1.3 | 1.1 | 1.4 | 1.2 | 3 | 1 | X | 8 | 8 |
| I | 3.2 | 3.4 | 3.1 | 4 | 4.1 | 4.8 | 3 | 1.2 | X | 3 |
| J | 2.1 | 2.2 | 7 | X | X | X | 3.1 | 8 | 9 | X |

(row labels: GATEWAYS)

FIG. 9

SYSTEM AND METHOD FOR MONITORING THE VOLUME OF CALLS CARRIED BY A VOICE OVER INTERNET PROTOCOL TELEPHONE SYSTEM

This application is a continuation-in-part of U.S. application Ser. No. 10/646,687 filed Aug. 25, 2003 now U.S. Pat. No. 7,577,131 which is a continuation-in-part of U.S. application Ser. No. 10/298,208, filed Nov. 18, 2002, now U.S. Pat. No. 7,529,225 the disclosure of both of which is hereby incorporated by reference. The application also claims priority to U.S. Provisional Patent Application Ser. No. 60/331,479, filed Nov. 16, 2001, and U.S. Utility application Ser. No. 10/094,671, filed Mar. 7, 2002, the disclosure of both of which is hereby incorporated by reference.

BACKGROUND OF THE INVENTION

1. Field of the Invention

The invention relates generally to the field of communications, and more specifically to a network configured for Voice over Internet Protocol (VoIP) and/or Facsimile over Internet Protocol (FoIP).

2. Background of the Related Art

Historically, most wired voice communications were carried over the Public Switched Telephone Network (PSTN), which relies on switches to establish a dedicated circuit between a source and a destination to carry an analog or digital voice signal. In the case of a digital voice signal, the digital data is essentially a constant stream of digital data. More recently, Voice over Internet Protocol (VoIP) was developed as a means for enabling speech communication using digital, packet-based, Internet Protocol (IP) networks such as the Internet. A principle advantage of IP is its efficient bandwidth utilization. VoIP may also be advantageous where it is beneficial to carry related voice and data communications over the same channel, to bypass tolls associated with the PSTN, to interface communications originating with Plain Old Telephone Service (POTS) with applications on the Internet, or for other reasons. As discussed in this specification, the problems and solutions related to VoIP may also apply to Facsimile over Internet Protocol (FoIP).

Throughout the description that follows there are references to analog calls over the PSTN. This phrase could refer to analog or digital data streams that carry telephone calls through the PSTN. This is distinguished from VoIP or FoIP format calls, which are formatted as digital data packets.

FIG. 1 is a schematic diagram of a representative architecture in the related art for VoIP communications between originating telephone 100 and destination telephone 145. In alternative embodiments, there may be multiple instances of each feature or component shown in FIG. 1. For example, there may be multiple gateways 125 controlled by a single controller 120. There may also be multiple controllers 120 and multiple PSTN's 115. Hardware and software components for the features shown in FIG. 1 are well-known. For example, controllers 120 and 160 may be Cisco SC2200 nodes, and gateways 125 and 135 may be Cisco AS5300 voice gateways.

To initiate a VoIP session, a user lifts a handset from the hook of originating telephone 100. A dial tone is returned to the originating telephone 100 via Private Branch Exchange (PBX) 110. The user dials a telephone number, which causes the PSTN 115 to switch the call to the originating gateway 125, and additionally communicates a destination for the call to the originating gateway 125. The gateway will determine which destination gateway a call should be sent to using a look-up table resident within the gateway 125, or it may consult the controller 120 for this information.

The gateway then attempts to establish a call with the destination telephone 145 via the VoIP network 130, the destination gateway 135, signaling lines 155 and the PSTN 140. If the destination gateway and PSTN are capable of completing the call, the destination telephone 145 will ring. When a user at the destination telephone 145 lifts a handset and says "hello?" a first analog voice signal is transferred through the PSTN 140 to the destination gateway 135 via lines 155. The destination gateway 135 converts the first analog voice signal originating at the destination telephone 145 into packetized digital data (not shown) and appends a destination header to each data packet. The digital data packets may take different routes through the VoIP network 130 before arriving at the originating gateway 125. The originating gateway 125 assembles the packets in the correct order, converts the digital data to a second analog voice signal (which should be a "hello?" substantially similar to the first analog signal), and forwards the second analog voice signal to the originating telephone 100 via lines 155, PSTN 115 and PBX 110. A user at the originating telephone 100 can speak to a user at the destination telephone 145 in a similar manner. The call is terminated when the handset of either the originating telephone 100 or destination telephone 145 is placed on the hook of the respective telephone. In the operational example described above, the telephone 105 is not used.

In the related art, the controllers 120 and 160 may provide signaling control in the PSTN and a limited means of controlling a gateway at one end of the call. It will be appreciated by those skilled in the art that, in some configurations, all or part of the function of the controllers 120 and 160 as described above may be embedded into the gateways 125 and 135, respectively.

VoIP in the related art presents several problems for a provider of network-based voice communication services. For example, because packets of information follow different routes between source and destination terminals in an IP network, it is difficult for network service providers to track data and bill for network use. In addition, VoIP networks in the related art lack adequate control schemes for routing packets through the Internet based upon the selected carrier service provider, a desired Quality of Service (QoS), cost, and other factors. Moreover, related art controllers do not provide sufficient interfaces between the large variety of signaling systems used in international communications. Other disadvantages related to monitoring and control also exist with present VoIP schemes.

SUMMARY OF THE INVENTION

An object of the invention is to solve at least one or more of the above problems and/or disadvantages in whole or in part and to provide at least the advantages described hereinafter.

Another object of the invention is to provide control of the calls carried by a voice over internet protocol telephone system to lessen or avoid any overloading of system resources that could occur.

In a system and method embodying the invention, the call traffic sent through individual destination gateways is monitored. If the traffic carried by any one gateway approaches the maximum capacity of that gateway, the system takes steps to re-route additional calls through alternate gateways.

This ensures that no gateway becomes overloaded. This, in turn, avoids situations where call setup requests are denied because of overloading.

In addition, in a system and method embodying the invention, an attempt is made to distribute calls to those destination gateways that are best suited for the calls. For instance, calls requiring a high call quality are sent to destination gateways capable of providing that quality. Calls requiring a very low cost for completion are sent to those destination gateways that can provide a very low completion cost. In this manner, the system assets are used in the most efficient manner.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIG. 9 is a diagram of a matrix illustrating a method for organizing quality of service data for communications paths between gateways;

DETAILED DESCRIPTION OF PREFERRED EMBODIMENTS

Figure 1:
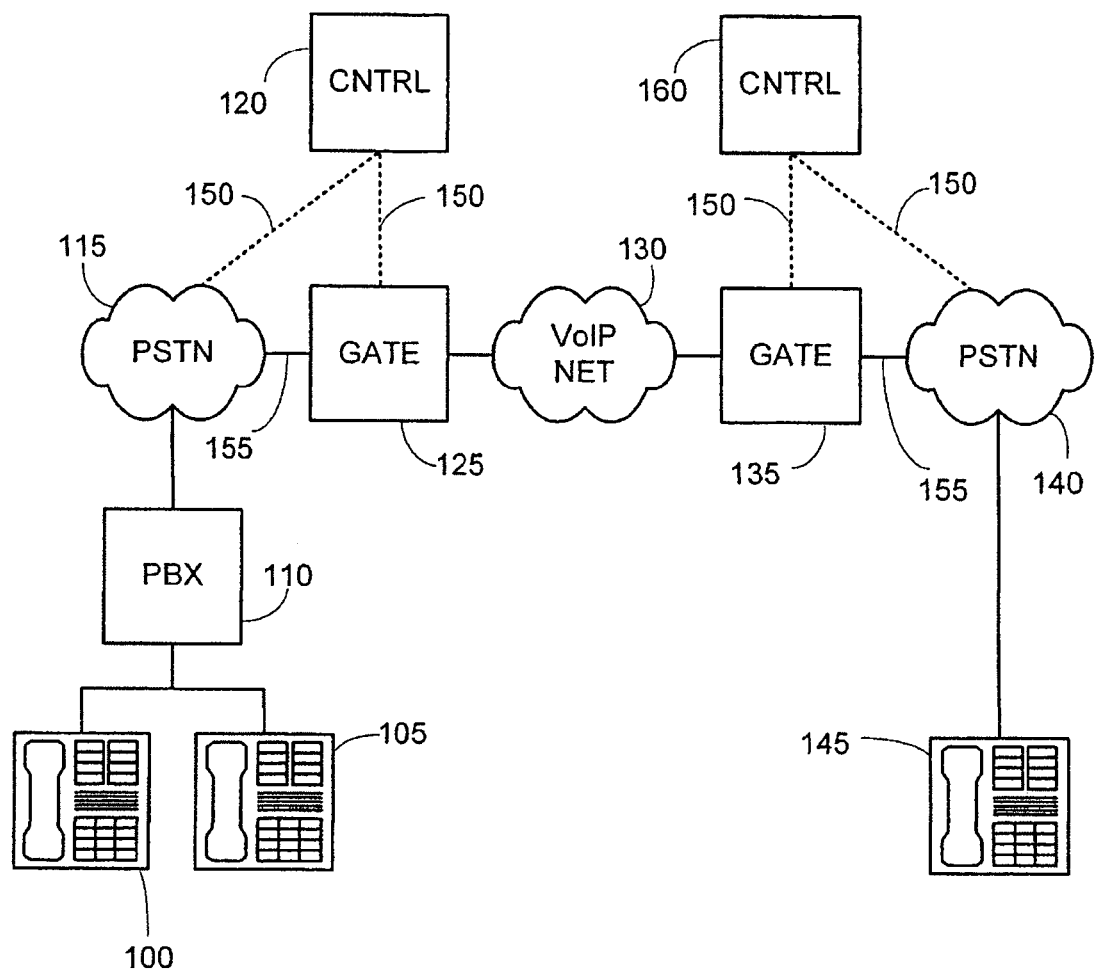
FIG. 1 is a schematic diagram of a system architecture providing VoIP communications, according to the background.
Figure 2:
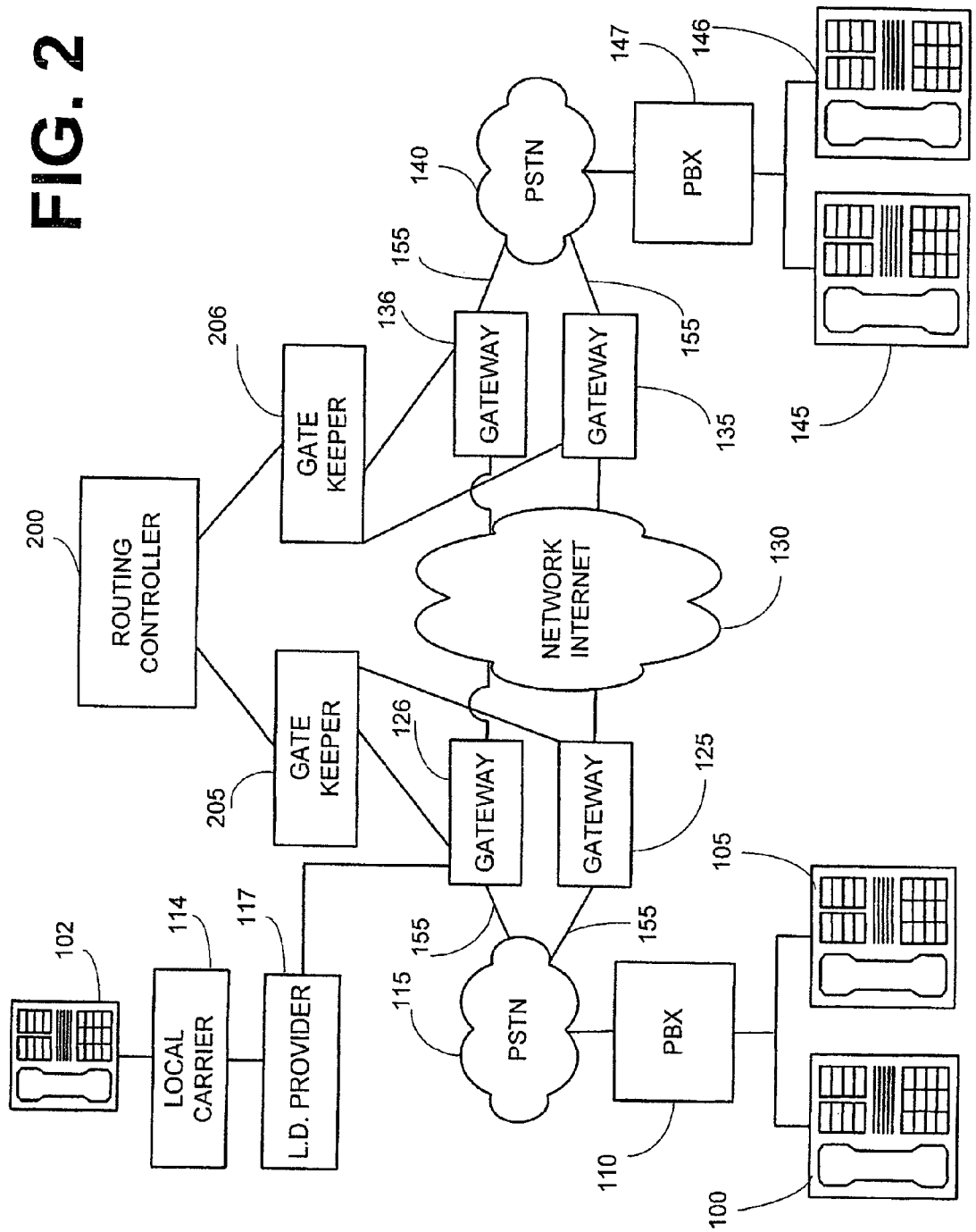
FIG. 2 is a schematic diagram of a system architecture providing VoIP/FoIP communications, according to a preferred embodiment of the invention.

A system embodying the invention is depicted in FIG. 2. The system includes telephones 100/105 connected to a private branch exchange (PBX) 110. The PBX, in turn, is connected to the PSTN 115. In addition, telephones 102 may be coupled to a local carrier 114, which in turn routes long distance calls to one or more long distance service providers 117. Those skilled in the art will recognize that calls could also originate from cellular telephones, computer based telephones, and/or other sources, and that those calls could also be routed through various carriers and service providers. Regardless of where the calls are originating from, they are ultimately forwarded to an originating gateway 125/126.

The originating gateways 125/126 function to convert an analog call into digital packets, which are then sent via the Internet 130 to a destination gateway 135/136. In some instances, the gateways may receive a call that has already been converted into a digital data packet format. In this case, the gateways will function to communicate the received data packets to the proper destination gateways. However, the gateways may modify the received data packets to include certain routing and other formatting information before sending the packets on to the destination gateways.

The gateways 125/126/135/136 are coupled to one or more gatekeepers 205/206. The gatekeepers 205/206 are coupled to a routing controller 200. Routing information used to inform the gateways about where packets should be sent originates at the routing controller.

One of skill in the art will appreciate that although a single routing controller 200 is depicted in FIG. 2, a system embodying the invention could include multiple routing controllers 200. In addition, one routing controller may be actively used by gatekeepers and gateways to provide routing information, while another redundant routing controller may be kept active, but unused, so that the redundant routing controller can step in should the primary routing controller experience a failure. As will also be appreciated by those skilled in the art, it may be advantageous for the primary and redundant routing controllers to be located at different physical locations so that local conditions affecting the primary controller are not likely to also result in failure of the redundant routing controller.

In a preferred embodiment of the invention, as depicted in FIG. 2, the digital computer network 130 used to communicate digital data packets between gateways may be compliant with the H.323 recommendation from the International Telecommunications Union (ITU). Use of H.323 may be advantageous for reasons of interoperability between sending and receiving points, because compliance with H.323 is not necessarily tied to any particular network, platform, or application, because H.323 allows for management of bandwidth, and for other reasons. Thus, in a preferred embodiment, one function of the originating gateways 125 and 126 and the terminating gateways 135 and 136 may be to provide a translation of data between the PSTN=s 115/135 and the H.323-based VoIP network 130. Moreover, because H.323 is a framework document, the ITU H.225 protocol may be used for communication and signaling between the gateways 125/126 and 135/136, and the IETF RTP protocol may be used for audio data between the gateways 125/126 and 135/136, and RAS (Registration, Admission, and Status) protocol may be used in communications with the gatekeepers 205/206.

According to the invention, the gatekeeper 205 may perform admission control, address translation, call signaling, call management, or other functions to enable the communication of voice and facsimile traffic over the PSTN networks 115/140 and the VoIP network 130. The ability to provide signaling for networks using Signaling System No. 7 (SS7) and other signaling types may be advantageous over network schemes that rely on gateways with significantly less capability. For example, related art gateways not linked to the gatekeepers of the present invention may only provide signaling for Multi-Frequency (MF), Integrated Services Digital Network (ISDN), or Dual Tone Multi-Frequency (DTMF).

According to a preferred embodiment of the present invention, the gatekeeper 205 may further provide an interface between different gateways, and the routing controller 200. The gatekeeper 205 may transmit routing requests to the routing controller 200, receive an optimized route from the routing controller 200, and execute the route accordingly.

Persons skilled in the art of communications will recognize that gatekeepers may also communicate with other gatekeepers to manage calls outside of the originating gatekeeper=s area of control. Additionally, it may be advantageous to have multiple gatekeepers linking a particular gateway with a particular routing controller so that the gatekeepers may be used as alternates, allowing calls to continue to be placed to all available gateways in the event of failure of a single gatekeeper. Moreover, although the gatekeeping function may be logically separated from the gateway function, embodiments where the gatekeeping and gateway functions are combined onto a common physical host are also within the scope of the invention.

In a system embodying the present invention, as shown in FIG. 2, a routing controller 200 is logically coupled to gateways 125/126 and 135/136 through gatekeepers 205/206. The routing controller 200 contains features not included in the prior art signaling controllers 120 and 160 of the prior art systems described above, as will be described below. Routing controller 200 and gatekeepers 205/206 may be hosted on one or more network-based servers which may be or include, for instance, a workstation running the Microsoft Windows™ N™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™, Java Virtual Machine or other operating system or platform. Detailed descriptions of the functional portions of a typical routing controller embodying the invention is provided below.

Figure 3:
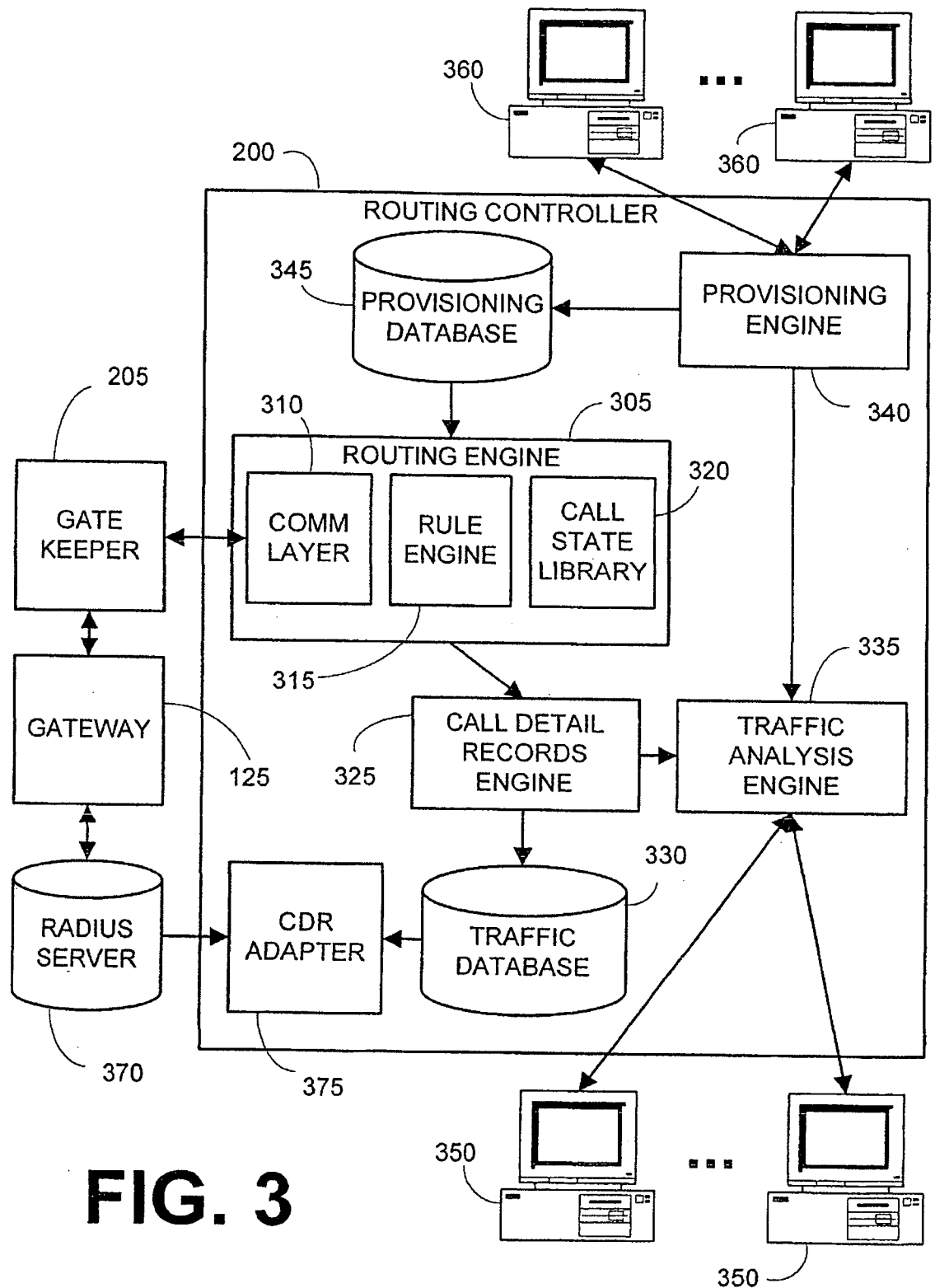
FIG. 3 is a schematic diagram of a system architecture providing improved control for VoIP communications, according to a preferred embodiment of the invention.

As indicated in FIG. 3, a routing controller 200 may include a routing engine 305, a Call Detail Record (CDR) engine 325, a traffic database 330, a traffic analysis engine 335, a provisioning engine 340, and a provisioning database 345. The routing engine 305, CDR engine 325, traffic analysis engine 335, and provisioning engine 340 may exist as independent processes and may communicate to each other through standard interprocess communication mechanisms. They might also exist on independent hosts and communicate via standard network communications mechanisms.

In alternative embodiments, the routing engine 305, Call Detail Record (CDR) engine 325, traffic database 330, traffic analysis engine 335, provisioning engine 340, or provisioning database 345 may be duplicated to provide redundancy. For instance, two CDR engines 325 may function in a master-slave relationship to manage the generation of billing data.

The routing engine 305 may include a communications layer 310 to facilitate an interface between the routing engine 305 and the gatekeepers 205/206. Upon receipt of a routing request from a gatekeeper, the routing engine 305 may determine the best routes for VoIP traffic based upon one or more predetermined attributes such as the selected carrier service provider, time of day, a desired Quality of Service (QoS), cost, or other factors. The routing information generated by the routing engine 305 could include a destination gateway address, and/or a preferred Internet Service Provider to use to place the call traffic into the Internet. Moreover, in determining the best route, the rule engine 315 may apply one or more exclusionary rules to candidate routes, based upon known bad routes, provisioning data from provisioning database 345, or other data.

The routing engine 305 may receive more than one request to route a single call. For example, when a first routing attempt was declined by the terminating gateway, or otherwise failed to result in a connection, or where a previous routing attempt resulted in a disconnect other than a hang-up by the originator or recipient, then the routing engine may receive a second request to route the same call. To provide redundancy, the routing engine 305 may generate alternative routes to a particular far-end destination. In a preferred embodiment of the invention, when the routing engine receives a routing request, the routing engine will return both preferred routing information, and alternative routing information. In this instance, information for at least one next-best route will be immediately available in the event of failure of the preferred route. In an alternative embodiment, routing engine 305 may determine a next-best route only after the preferred route has failed. An advantage of the latter approach is that routing engine 305 may be able to better determine the next-best route with the benefit of information concerning the most recent failure of the preferred route.

To facilitate alternative routing, and for other reasons, the routing engine 305 may maintain the state of each VoIP call in a call state library 320. For example, routing engine 305 may store the state of a call as "set up," "connected," "disconnected," or some other state.

Routing engine 305 may further format information about a VoIP call such as the originator, recipient, date, time, duration, incoming trunk group, outgoing trunk group, call states, or other information, into a Call Detail Record (CDR). Including the incoming and outgoing trunk group information in a CDR may be advantageous for billing purposes over merely including IP addresses, since IP addresses may change or be hidden, making it difficult to identify owners of far-end network resources. Routing engine 305 may store CDR's in a call state library 320, and may send CDR's to the CDR engine 325 in real time, at the termination of a call, or at other times.

The CDR engine 325 may store CDR's to a traffic database 330. To facilitate storage, the CDR engine 325 may format CDR's as flat files, although other formats may also be used. The CDR's stored in the traffic database 330 may be used to generate bills for network services. The CDR engine 325 may also send CDR's to the traffic analysis engine 335.

Data necessary for the billing of network services may also be stored in a Remote Authentication Dial-In User Service (RADIUS) server 370. In fact, in some embodiments, the data stored in the RADIUS server may be the primary source of billing information. The RADIUS server 370 may also directly communicate with a gateway 125 to receive and store data such as incoming trunk group, call duration, and IP addresses of near-end and far-end destinations. The CDR adapter 375 may read data from both the traffic database 330 and the RADIUS server 370 to create a final CDR. The merged data supports customer billing, advantageously including information which may not be available from RADIUS server 370 alone, or the traffic database 330 alone.

The traffic analysis engine 335 may collect CDR's, and may automatically perform traffic analysis in real time, near real time, or after a predetermined delay. In addition, traffic analysis engine 335 may be used to perform post-traffic analysis upon user inquiry. Automatic or user-prompted analysis may be performed with reference to a predetermined time period, a specified outgoing trunk group, calls that exceed a specified duration, or according to any other variable(s) included in the CDR's.

The provisioning engine 340 may perform tasks necessary to route particular calls over the Internet. For example, the provisioning engine 340 may establish or modify client account information, authorize a long distance call, verify credit, assign phone numbers where the destination resides on a PSTN network, identify available carrier trunk groups, generate routing tables, or perform other tasks. In one embodiment of the invention, provisioning may be performed automatically. In another embodiment, provisioning may be performed with user input. Hybrid provisioning, that is, a combination of automated and manual provisioning, may also be performed. The provisioning engine 340 may further cause provisioning data to be stored in a provisioning database 345.

Client workstations 350 and 360 may be coupled to routing controller 200 to provide a user interface. As depicted in FIG. 3, the client(s) 350 may interface to the traffic analysis engine 335 to allow a user to monitor network traffic. The client(s) 360 may interface to the provisioning engine 340 to allow a user to view or edit provisioning parameters. In alternative embodiments, a client may be adapted to interface to both the traffic analysis engine 335 and provisioning engine 340, or to interface with other features of routing controller 200.

In a system embodying the invention, as shown in FIG. 2, the gateways 125/126 would first receive a request to set up a telephone call from the PSTN, or from a Long Distance Provider 117, or from some other source. The request for setting up the telephone call would typically include the destination telephone number. In order to determine which destination gateway should receive the packets, the gateway would consult the gatekeeper 205.

The gatekeeper 205, in turn may consult the routing controller 200 to determine the most appropriate destination gateway. In some situations, the gatekeeper may already have the relevant routing information. In any event, the gatekeeper would forward the routing information to the originating gateway 125/126, and the originating gateway would then send the appropriate packets to the appropriate destination gateway. As mentioned previously, the routing information provided by the gatekeeper may include just a preferred destination gateway, or it may include both the preferred destination gateway information, and information on one or more next-best destination gateways. The routing information may also include a preferred route or path onto the Internet, and one or more next-best route. The routing information may further include information about a preferred Internet Service Provider.

Figure 4:
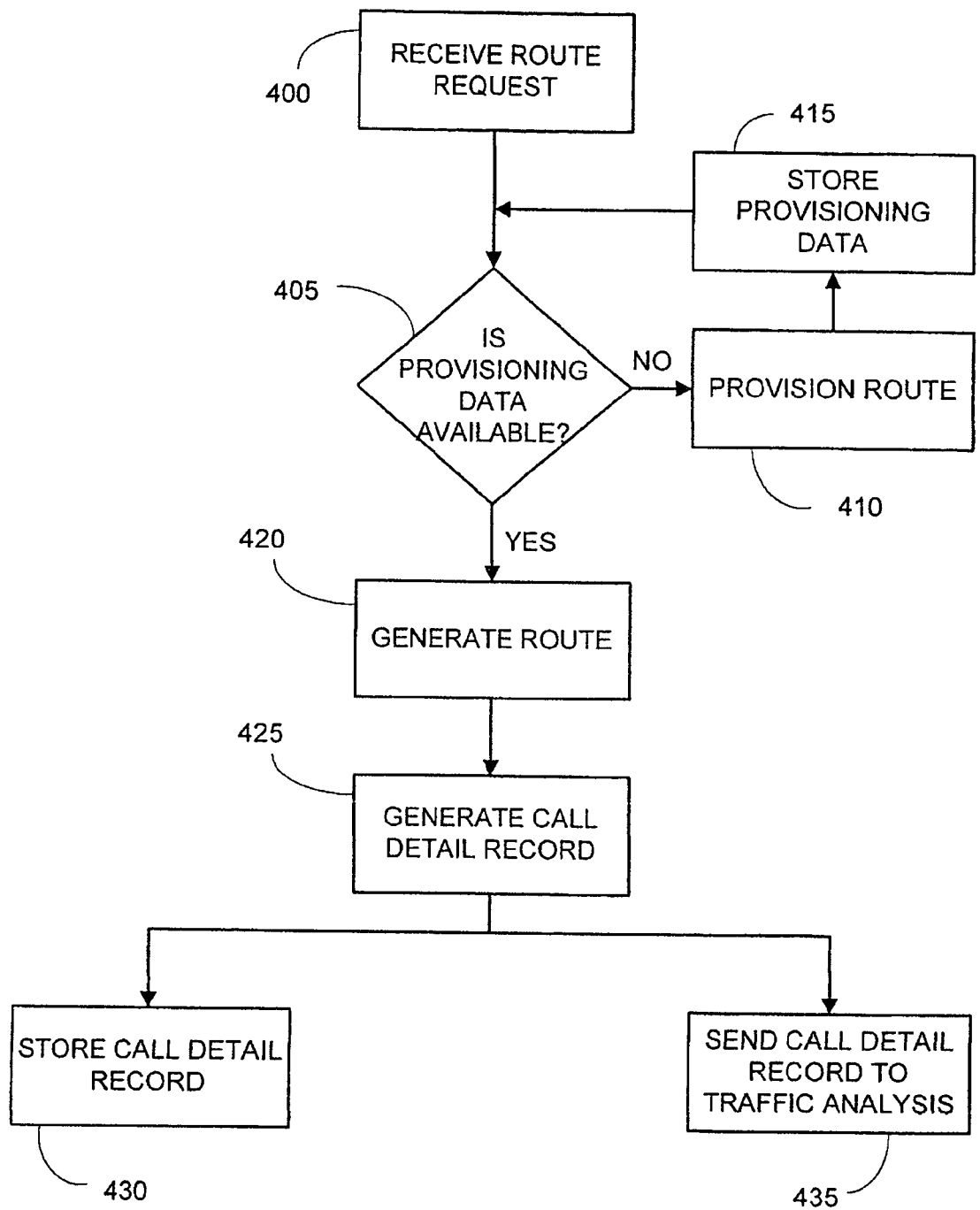
FIG. 4 is a flow diagram illustrating a method for routing control, according to a preferred embodiment of the invention.

FIG. 4 is a flow chart illustrating a method embodying the invention for using the routing controller 200. In step 400, the routing controller 200 receives a routing request from either a gatekeeper, or a gateway. In step 405, a decision is made as to whether provisioning data is available to route the call. If the provisioning data is not available, the process advances to step 410 to provision the route, then to step 415 for storing the provisioning data before returning to decision step 405.

If, on the other hand, if it is determined in step 405 that provisioning data is available, then the process continues to step 420 for generating a route. In a preferred embodiment of the invention, step 420 may result in the generation of information for both a preferred route, and one or more alternative routes. The alternative routes may further be ranked from best to worst.

The routing information for a call could be simply information identifying the destination gateway to which a call should be routed. In other instances, the routing information could include information identify the best Internet Service Provider to use to place the call traffic onto the Internet. In addition, the routing controller may know that attempting to send data packets directly from the originating gateway to the destination gateway is likely to result in a failed call, or poor call quality due to existing conditions on the Internet. In these instances, the routing information may include information that allows the data packets to first be routed from the originating gateway to one or more interim gateways, and then from the interim gateways to the ultimate destination gateway. The interim gateways would simply receive the data packets and immediately forward the data packets on to the ultimate destination gateway.

Step 420 may also include updating the call state library, for example with a call state of "set up" once the route has been generated. Next, a CDR may be generated in step 425. Once a CDR is available, the CDR may be stored in step 430 and sent to the traffic analysis engine in step 435. In one embodiment, steps 430 and 435 may be performed in parallel, as shown in FIG. 4. In alternative embodiments, steps 430 and 435 may be performed sequentially. In yet other embodiments, only step 430 or only 435 may be performed.

Figure 5:
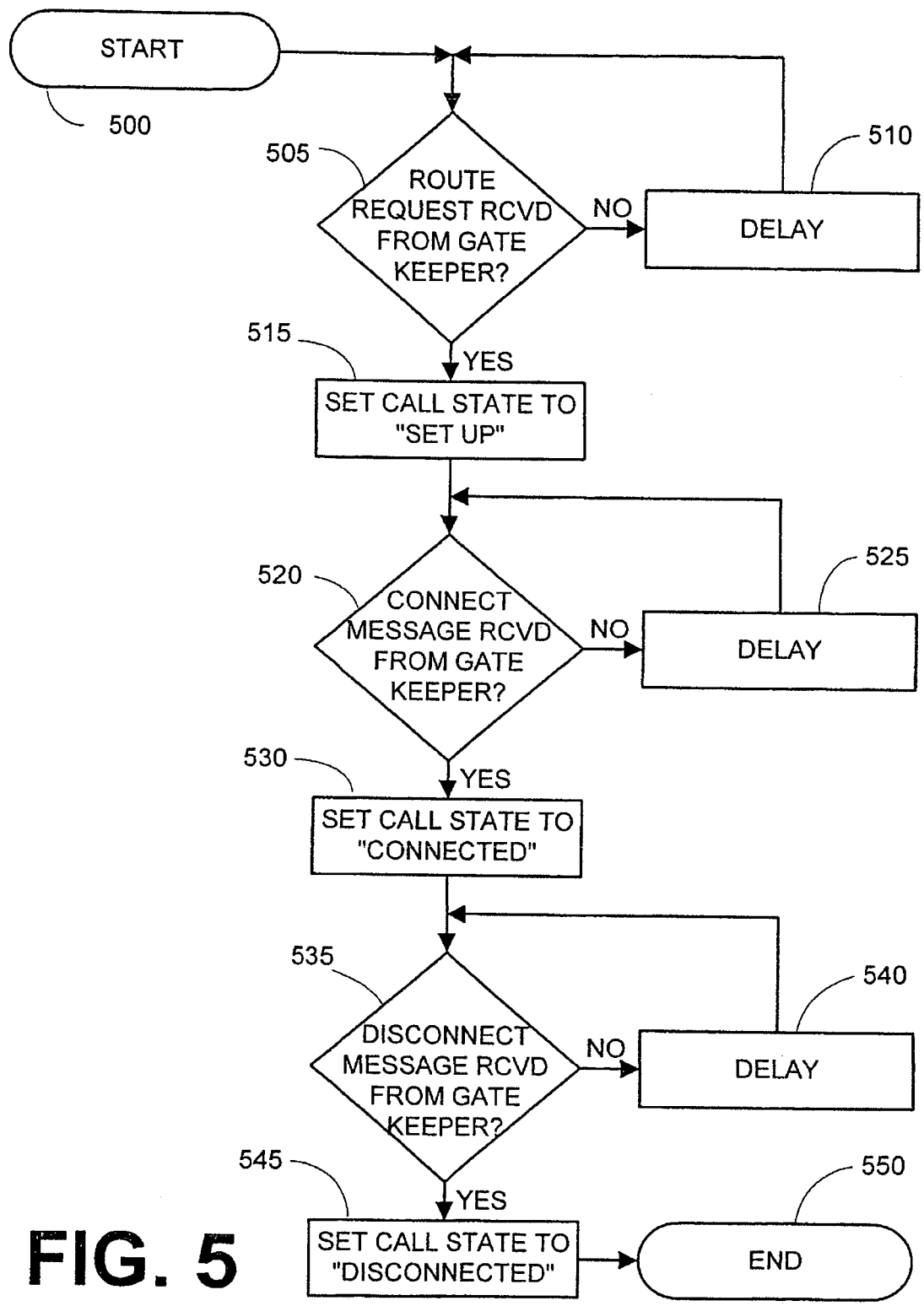
FIG. 5 is a flow diagram illustrating a method for maintaining a call state, according to a preferred embodiment of the invention.

FIG. 5 is a flow diagram illustrating a method for maintaining a call state, which may be performed by routing engine 305. After starting in step 500, the process may determine in step 505 whether a route request has been received from a gatekeeper or other source. If a routing request has not been received, the process may advance to a delay step 510 before returning to decision step 505. If, however, it is determined in step 505 that a route request has been received, then a call state may be set to "set up" in step 515.

The process of FIG. 5 may then determine in step 520 whether a connect message has been received from a gatekeeper or other source. If a connect message has not been received, the process may advance to delay step 525 before returning to decision step 520. If, however, it is determined in step 520 that a connect message has been received, then a call state may be set to "connected" in step 530.

The process of FIG. 5 may then determine in step 535 whether a disconnect message has been received from a gate keeper or other source. If a disconnect message has not been received, the process may advance to delay step 540 before returning to decision step 535. If, however, it is determined in step 535 that a disconnect message has been received, then a call state may be set to "disconnected" in step 545 before the process ends in step 550.

The process depicted in FIG. 5 will operate to keep the call state for all existing calls up to date to within predetermined delay limits. In alternative embodiments of the invention, the call state monitoring process can monitor for other call states such as "hang-up," "busy," or other call states not indicated above. Moreover, monitoring for other call states may be instead of, or in addition to, those discussed above. Further, in one embodiment, monitoring could be performed in parallel, instead of the serial method illustrated in FIG. 5.

Figure 6:
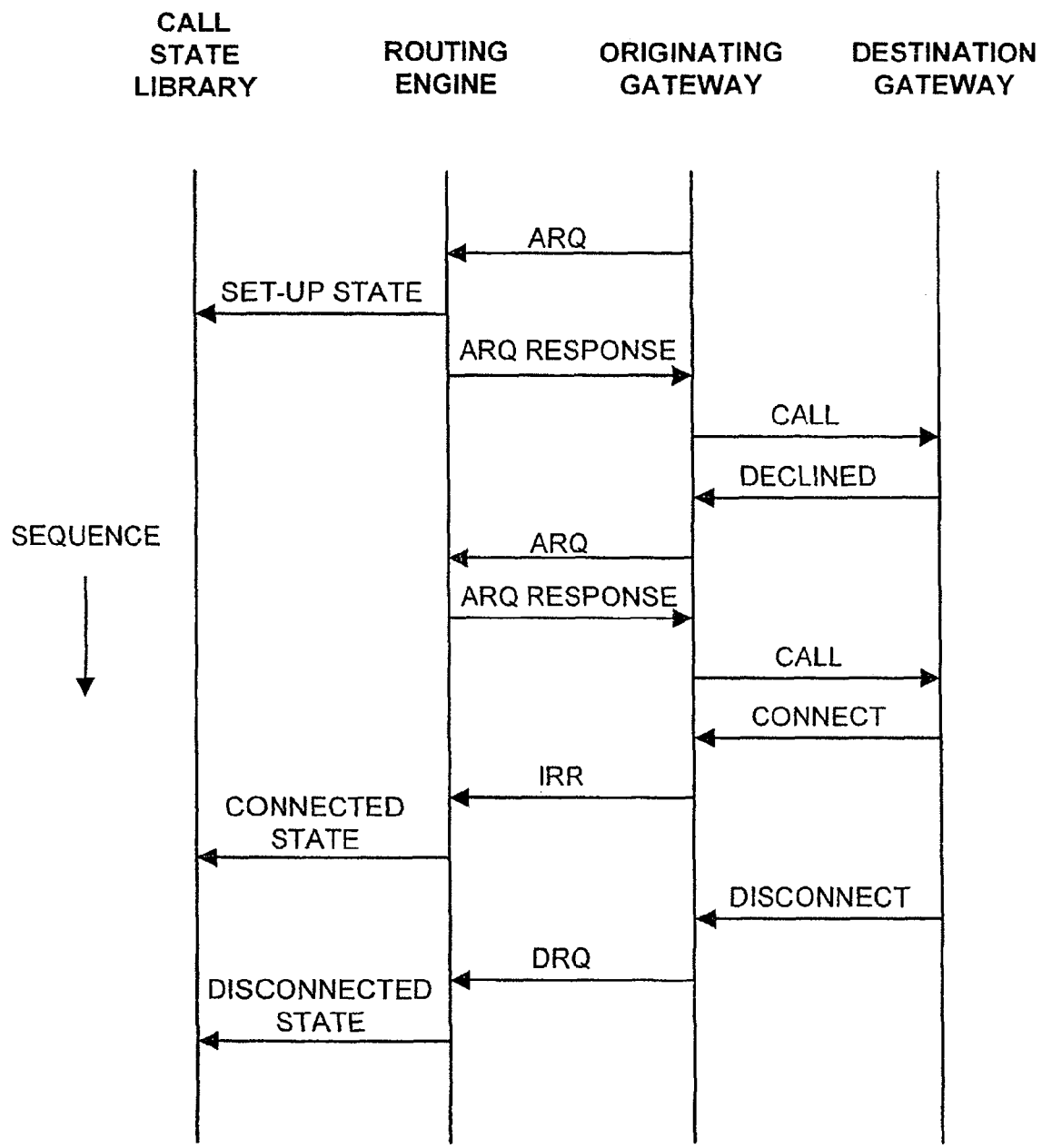
FIG. 6 is a sequence diagram illustrating a method for communicating between functional nodes of a VoIP network, according to a preferred embodiment of the invention.

FIG. 6 discloses a sequence of messages between an originating gateway, a routing engine, a call state library, and a destination gateway, according to a preferred embodiment of the invention. In operation of the network, the originating gateway may send a first request for routing information, in the form of a first Admission Request (ARQ) message, to a routing engine within a routing controller. The request would probably be passed on through a gatekeeper logically positioned between the gateway and the routing engine in the routing controller.

Upon receipt of the routing request, the routing engine may store a set-up state in call state library. The routing engine may then determine a best route based upon one or more predetermined attributes such as the selected carrier service provider, a desired Quality of Service (QoS), cost, or other factors. The routing engine may then send information pertaining to the best route to the originating gateway, possibly via a gatekeeper, as a first ARQ response message. The gateway would then initiate a first call to a destination gateway using the information contained within the response message. As shown in FIG. 6, the destination gateway may return a decline message to the originating gateway.

When the originating gateway receives a decline message, the gateway may send a second request for routing information, in the form of a second ARQ message, to routing engine. Routing engine may recognize the call as being in a set up state, and may determine a next best route for completion of the call. Routing engine may then send a second ARQ response message to the originating gateway. The originating gateway may then send a second call message to the same or a newly selected destination gateway using the next best route. In response to the second call message, the destination gateway may return a connect message to the originating gateway.

The routing engine may use a conference ID feature of the H.323 protocol, which is unique to every call, in order to keep track of successive routing attempts. Thus, upon receiving a first ARQ for a particular call, routing engine may respond with a best route; upon receiving a second ARQ associated with the same call, routing engine may respond with the second best route. If the second call over the next best route does not result in a connection, the originating gateway may send a third ARQ message to routing engine, and so on, until an ARQ response message from routing engine enables a call to be established between the originating gateway and a destination gateway capable of completing the call to the called party.

In alternative embodiments of the invention, the initial ARQ response from the routing engine to the originating gateway may include information about the best route, and one or more next-best routes. In this instance, when a call is declined by one terminating gateway, the originating gateway can simply attempt to route the call using the next-best route without the need to send additional queries to the routing engine.

Once the originating gateway receives a connect message from a destination gateway, the originating gateway may send an Information Request Response (IRR) message to the routing engine to indicate the connect. In response, the routing engine may store a connected state message to the call state library.

After a call is connected, a call may become disconnected. A disconnect may occur because a party has hung up, because of a failure of a network resource, or for other reasons. In this instance, destination gateway may send a disconnect message to the originating gateway. In response, originating gateway may send a Disengage Request (DRQ) message to the routing engine. The routing engine may then update the call state by storing a disconnected state status in the call state library.

Figure 7:
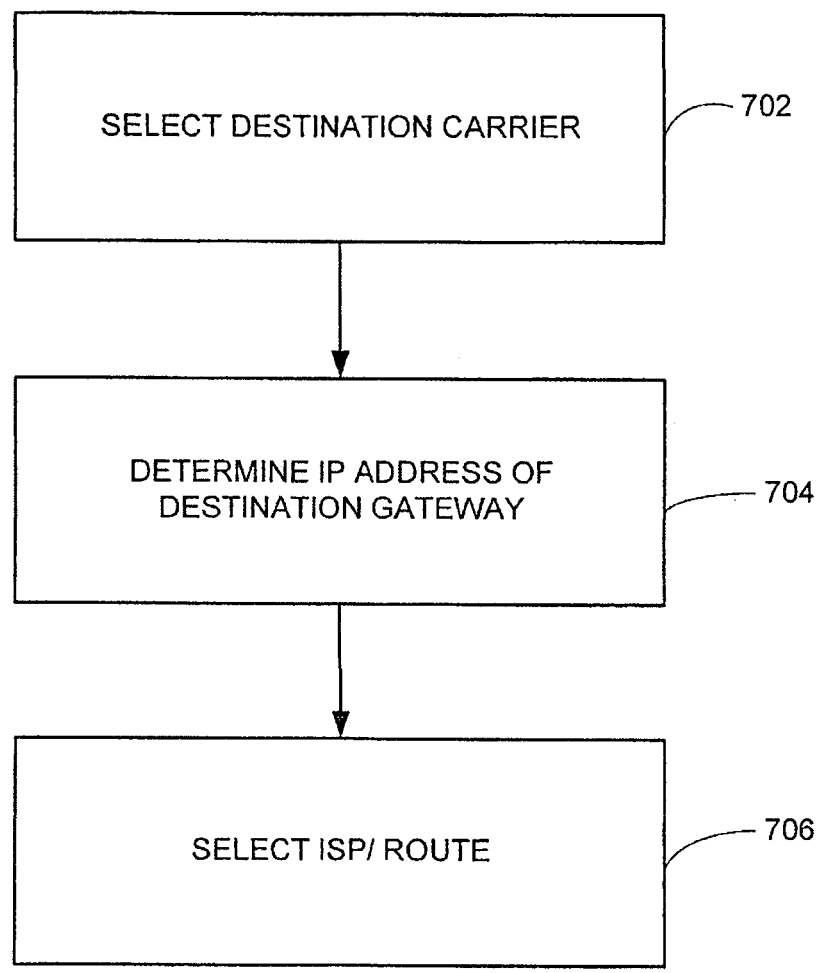
FIG. 7 is a flow diagram illustrating a three level routing method, according to a preferred embodiment of the invention.

FIG. 7 is a flow diagram illustrating a method, according to a preferred embodiment of the invention, for generating routing information in response to a routing request. As shown in FIG. 7, when a routing controller (or a gatekeeper) receives a routing request from a gateway, the method first involves selecting a destination carrier that is capable of completing the call to the destination telephone in step 702. In some instances, there may be only one destination carrier capable of completing the call to the destination telephone. In other instances, multiple destination carriers may be capable of completing the call. In those instances where multiple carriers are capable of completing the call, it is necessary to initially select one destination carrier. If the call is completed on the first attempt, that carrier will be used. If the first attempt to complete the call fails, the same or a different carrier may ultimately be used to complete the call.

Where there are multiple destination carriers capable of completing the call, the selection of a particular destination carrier may be based on one or more considerations including the cost of completing the call through the destination carriers, the quality of service offered by the destination carriers, or other considerations. The destination carrier may be selected according to other business rules including, for example, an agreed upon volume or percentage of traffic to be completed through a carrier in a geographic region. For instance, there may be an agreement between the system operator and the destination carrier that calls for the system operator to make minimum daily/monthly/yearly payments to a destination carrier in exchange for the destination carrier providing a predetermined number of minutes of service. In those circumstances, the system operator would want to make sure that the destination carrier is used to place calls for at least the predetermined number of minutes each day/month/year before routing calls to other destination carriers to ensure that the system operator derives the maximum amount of service from the destination carrier in exchange for the minimum guaranteed payment. Business rules taking onto account these and other similar types of considerations could then be used to determine which destination carrier to use.

Once the destination carrier has been selected, the method would include identifying an IP address of a destination gateway connected to the destination carrier and capable of passing the call on to the destination carrier. The destination gateway could be operated by the system operator, or by the destination carrier, or by a third party. Typically, a table would be consulted to determine which destination gateways correspond to which destination carriers and geographic locations.

Often there may be multiple destination gateways capable of completing a call to a particular destination carrier. In this situation, the step of determining the IP address could include determining multiple destination IP addresses, each of which correspond to destination gateways capable of completing the call to the destination carrier. Also, the IP address information may be ranked in a particular order in recognition that some destination gateways may offer more consistent or superior IP quality. Also, if two or more destination gateways capable of completing a call to a destination carrier are operated by different parties, there may be cost considerations that are also used to rank the IP address information. Of course, combinations of these and other considerations could also be used to select particular destination gateways, and to thus determine the IP address(es) to which data packets should be sent.

In some embodiments of the invention, determining the IP address(es) of the terminating gateway(s) may be the end of the process. This would mean that the system operator does not care which Internet Service Provider (ISP) or which route is used to place data traffic onto the Internet. In other instances, the method would include an additional step, step 806, in which the route onto the Internet and/or the ISP would then be selected. The selection of a particular ISP may be based on a quality of service history, the cost of carrying the data, or various other considerations. The quality of service history may take into account packet loss, latency and other IP based considerations. Also, one ISP may be judged superior at certain times of the day/week, while another ISP may be better at other times. As will be described in more detail below, the system has means for determining the quality of service that exists for various routes onto the Internet. This information would be consulted to determine which route/ISP should be used to place call data onto the Internet. Further, as mentioned above, in some instances, the routing information may specify that the call data be sent from the originating gateway to an interim gateway, and then from the interim gateway to the destination gateway. This could occur, for example, when the system knows that data packets placed onto the Internet at the originating gateway and addressed directly to the destination gateway are likely to experience unacceptable delays or packet loss.

In some instances, the quality of service can be the overriding consideration. In other instances, the cost may be the primary consideration. These factors could vary client to client, and call to call for the same client.

For example, the system may be capable of differentiating between customers requiring different call quality levels. Similarly, even for calls from a single customer, the system may be capable of differentiating between some calls that require high call quality, such as facsimile transmissions, and other calls that do not require a high call quality, such as normal voice communications. The needs and desires of customers could be determined by noting where the call originates, or by other means. When the system determines that high call quality is required, the system may eliminate some destination carriers, destination gateways, and ISPs/ routes from consideration because they do not provide a sufficiently high call quality. Thus, the system may make routing decisions based on different minimum thresholds that reflect different customer needs.

Figure 8:
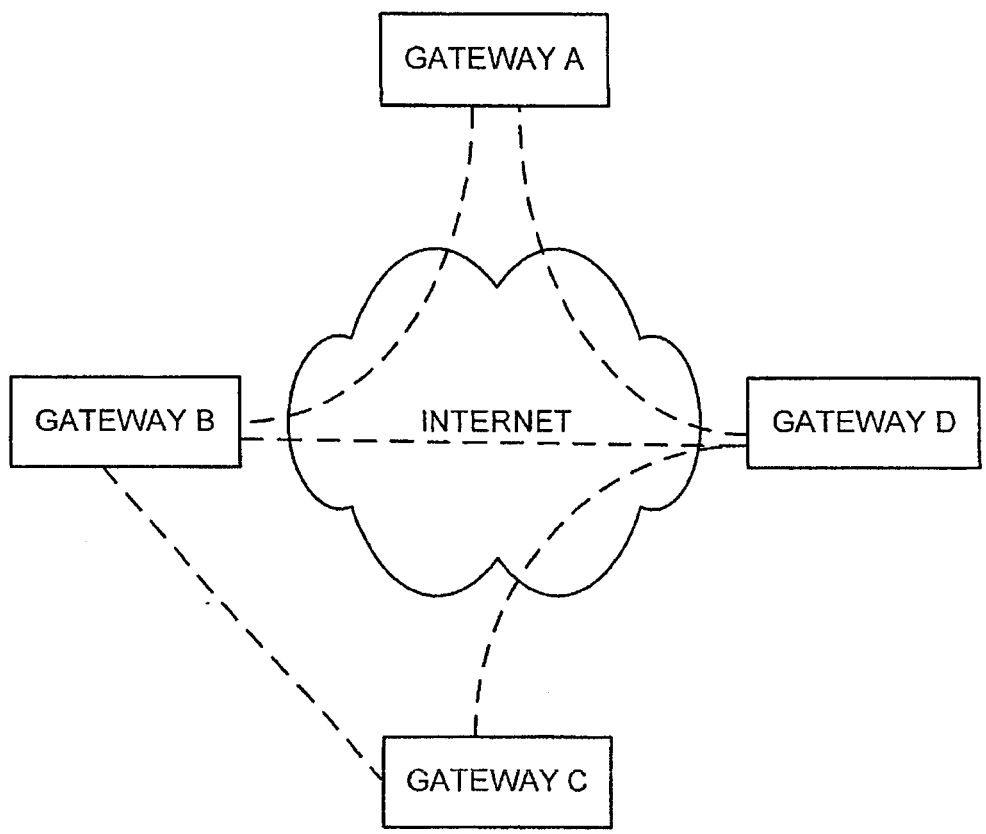
FIG. 8 is a schematic diagram of a system architecture embodying the invention.

FIG. 8 shows a conceptual diagram of four gateways with access to the Internet. Gateway A can reach Gateways B and C via the Internet. Gateway C can reach Gateway D via the Internet, and Gateway B via an external connection. Due to Internet conditions, it will often be the case that certain Gateways, while having access to the Internet, cannot reliably send data packets to other gateways connected to the Internet. Thus, FIG. 8 shows that Gateway C cannot reach Gateways B or A through the Internet. This could be due to inordinately long delays in sending data packets from Gateway C to Gateways A and B, or for other reasons.

The gateways illustrated in FIG. 8 could be gateways controlled by the system operator. Alternatively, some of the gateways could be maintained by a destination carrier, or a third party. As a result, the gateways may or may not be connected to a routing controller through a gatekeeper, as illustrated in FIG. 2. In addition, some gateways may only be capable of receiving data traffic and passing it off to a local or national carrier, while other gateways will be capable of both receiving and originating traffic.

Some conclusions logically flow from the architecture illustrated in FIG. 8. For instance, Gateway B can send data traffic directly to Gateway D through the Internet, or Gateway B could choose to send data to Gateway D by first sending the traffic to Gateway A, and then having Gateway A forward the traffic to Gateway D. In addition, Gateway B could send the traffic to Gateway C via some type of direct connection, and then have Gateway C forward the data on to Gateway D via the Internet.

The decision about how to get data traffic from one gateway to another depends, in part, on the quality of service that exists between the gateways. The methods embodying the invention that are described below explain how one can measure the quality of service between gateways, and then how the quality measurements can be used to make routing decisions.

As is well known in the art, a first gateway can Aping@ a second gateway. A Aping@ is a packet or stream of packets sent to a specified IP address in expectation of a reply. A ping is normally used to measure network performance between the first gateway and the second gateway. For example, pinging may indicate reliability in terms of a number of packets which have been dropped, duplicated, or re-ordered in response to a pinging sequence. In addition, a round trip time, average round trip time, or other round trip time statistics can provide a measure of system latency.

In some embodiments of the invention, the quality of service measurements may be based on an analysis of the round trip of a ping. In other embodiments, a stream of data packets sent from a first gateway to a second gateway could simply be analyzed at the second gateway. For instance, numbered and time-stamped data packets could be sent to the second gateway, and the second gateway could determine system latency and whether packets were dropped or reordered during transit. This information could then be forwarded to the routing controller so that the information about traffic conditions between the first and second gateways is made available to the first gateway.

A system as illustrated in FIG. 8 can use the data collected through pings to compare the quality and speed of a communication passing directly between a first gateway and a second gateway to the quality and speed of communications that go between the first and second gateways via a third or intermediate gateway. For instance, using the system illustrated in FIG. 8 as an example, the routing controller could hold information about traffic conditions directly between Gateway B and Gateway D, traffic conditions between Gateway B and Gateway A, and traffic conditions between Gateway A and Gateway D. If Gateway B wants to send data packets to Gateway D, the routing controller could compare the latency of the route directly from Gateway B to Gateway D to the combined latency of a route that includes communications from Gateway B to Gateway A and from Gateway A to Gateway D. Due to local traffic conditions, the latency of the path that uses Gateway A as an interim Gateway might still be less than the latency of the direct path from Gateway B to Gateway D, which would make this route superior.

In methods embodying the invention, each gateway capable of directly accessing another gateway via the Internet may periodically ping each of the other gateways. The information collected from the pings is then gathered and analyzed to determine one or more quality of service ratings for the connection between each of the gateways. The quality of service ratings can then be organized into tables, and the tables can be used to predict whether a particular call path is likely to provide a given minimum quality of service.

To reduce the amount of network traffic and the volume of testing, only one gateway within a group of co-located gateways may be designated as a proxy tester for all gateways within the co-located group. In addition, instead of pinging a far-end gateway, one might ping other Internet devices that are physically close to the far-end gateway. These steps save network bandwidth by reducing the required volume of testing. Also, the testing can be delegated to lower cost testing devices, rather than expensive gateways.

A quality of service measure would typically be calculated using the raw data acquired through the pinging process. As is well known to those of skill in the art, there are many different types of data that can be derived from the pinging itself, and there is an almost infinite variety of ways to combine this data to calculate different quality of service measures.

FIG. 9 is a diagram of a matrix of quality of service data that indicates the quality of service measured between 10 different gateways, gateways A-J. This table is prepared by having each of the gateways ping each of the other gateways. The data collected at a first gateway is then collected and used to calculate a quality of rating between the first gateway and each of the other gateways. A similar process of collection and calculation occurs for each of the other gateways in the system. The calculated quality of service values are then inserted into the matrix shown in FIG. 9. For instance, the quality measure value at the intersection of row A and column D is 1.8. Thus, the value of 1.8 represents the quality of service for communications between Gateways A and D. When an X appears in the matrix, it means that no communications between the row and column gateways was possible the last time the pings were collected.

Although only a single value is shown in the matrix illustrated in FIG. 9, multiple quality of service values could be calculated for communications between the various gateways. In other words, multiple values might be stored at each intersection point in the matrix. For instance, pings could be used to calculate the packet loss (PL), latency (LA), and a quality of service value (Q) which is calculated from the collected pinging data. In this instance, each intersection in the matrix would have an entry of APL, LA, Q@. Other combinations of data could also be used in a method and matrix embodying the invention.

The pinging, data collection and calculation of the values shown in the matrix could be done in many different ways. Two alternative methods are illustrated in FIGS. 10A and 10B.

Figure 10:
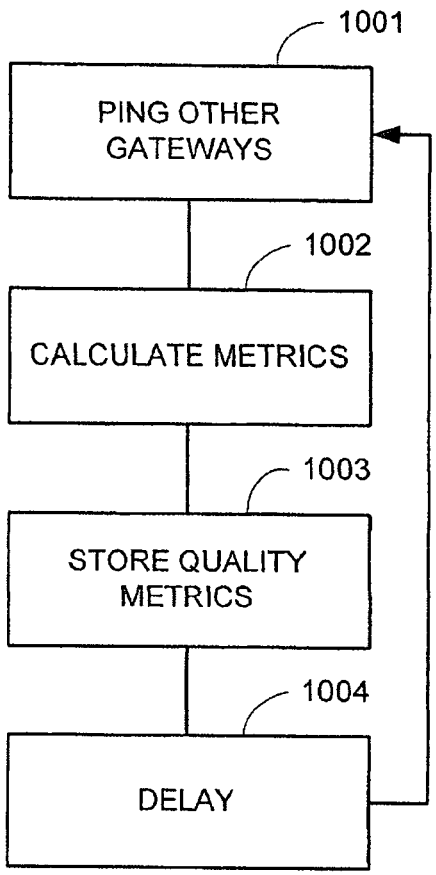
FIGS. 10A and 10B are flow diagrams of alternate methods of obtaining quality of service data for alternate communications paths.
Figure 10:
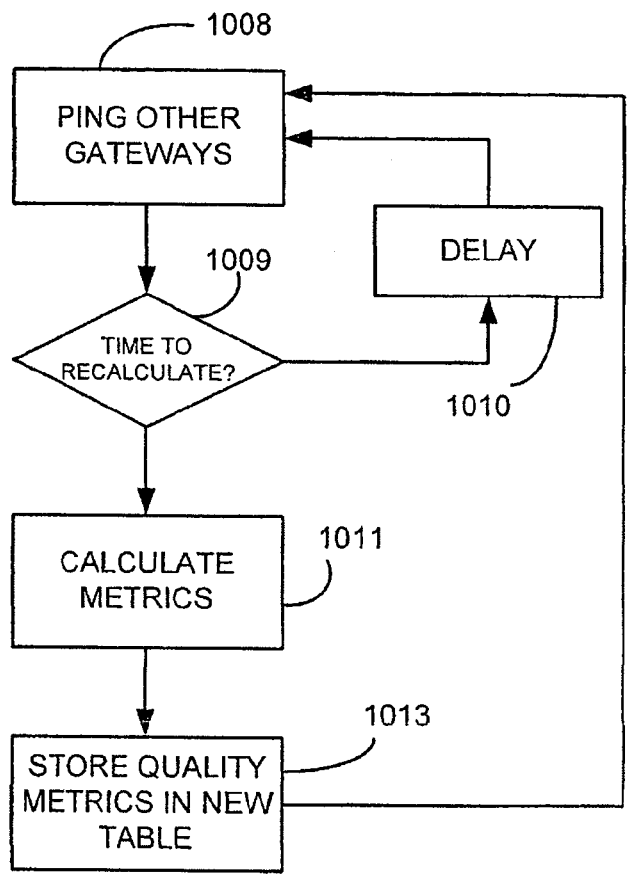

In the method shown in FIG. 10A, pinging occurs in step 1001. As discussed above, this means that each gateway pings the other gateways and the results are recorded. In step 1002, the data collected during the pinging step is analyzed and used to calculate various quality measures. In step 1003, the quality metrics are stored into the matrix. The matrix can then be used, as discussed below, to make routing decisions. In step 1004, the method waits for a predetermined delay period to elapse. After the delay period has elapsed, the method returns to step 1001, and the process repeats.

It is necessary to insert a delay into the method to avoid excessive pinging from occurring. The traffic generated by the pinging process takes up bandwidth that could otherwise be used to carry actual data traffic. Thus, it is necessary to strike a balance between conducting the pinging often enough to obtain accurate information and freeing up the system for actual data traffic. In addition, the bandwidth used by testing can also be managed by controlling the number of pings sent per test. Thus, the consumption of bandwidth is also balanced against the ability to measure packet loss.

The alternate method shown in FIG. 10B begins at step 1008 when the pinging process is conducted. Then, in step 1009, the system determines whether it is time to re-calculate all the quality of service metrics. This presupposes that the matrix will only be updated at specific intervals, rather than each time a pinging process is conducted. If it is not yet time to update the matrix, the method proceeds to step 1010, where a delay period is allowed to elapse. This delay is inserted for the same reasons discussed above. Once the delay period has elapsed, the method returns to step 1008 where the pinging process is repeated.

If the result of step 1009 indicates that it is time to recalculate the quality metrics, the method proceeds to step 1011, where the calculations are performed. The calculated quality metrics are then stored in the matrix in step 1013, and the method returns to step 1008. In this method, the matrix is not updated as frequently, and there is not as high a demand for performing the calculations. This can conserve valuable computer resources. In addition, with a method as illustrated in FIG. 10B, there is data from multiple pings between each of the gateways for use in making the calculations, which can be desirable depending on the calculations being performed. In some embodiments of the invention, once the Quality Metrics have been updated, the system may wait for a delay period to elapse before returning to step 1008 to restart the pinging process. Furthermore, the system may conduct a certain amount of pinging, then wait before calculating the metrics. In other words, the pinging and calculating steps may be on completely different schedules.

In either of the methods described above, the data used to calculate the quality metrics could include only the data recorded since the last calculations, or additional data recorded before the last set of quality metrics were calculated. For instance, pinging could occur every five minutes, and the quality metrics could be calculated every five minutes, but each set of calculations could use data recorded over the last hour.

Figure 11:
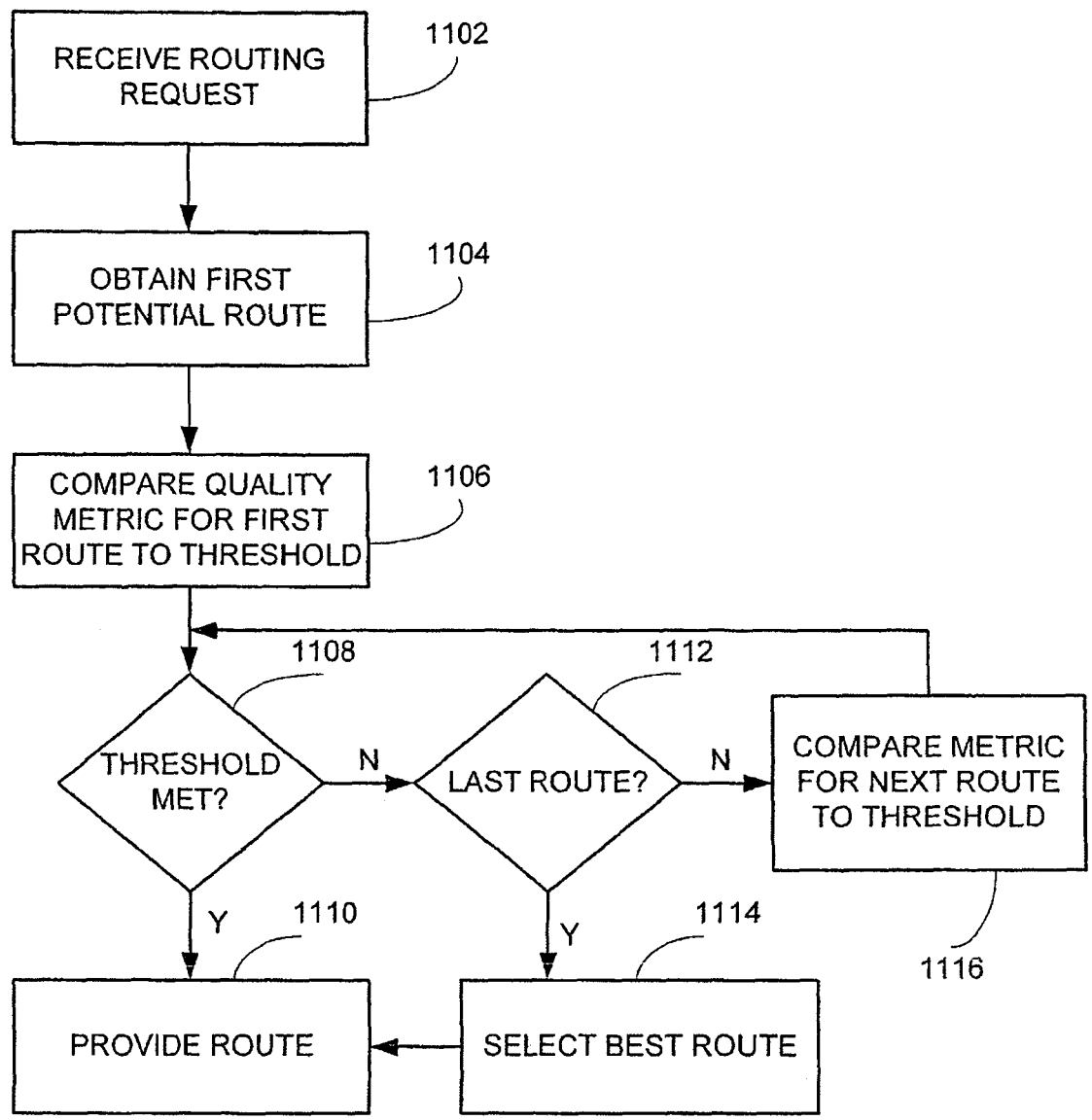
FIG. 11 is a flow diagram of a method for making routing decisions according to a preferred embodiment of the present invention.

FIG. 11 illustrates a method embodying the invention for selecting and providing routing information to a gateway making a routing request. This method would typically be performed by the gatekeeper connected to a gateway, or by the routing controller.

In step 1102, a routing request would be received. In step 1104, the system would obtain a first potential route. This step could involve all of the considerations discussed above relating to the selection of a destination carrier and/or destination gateway and/or an ISP or route between the originating gateway and the destination gateway.

Once the first potential route is determined, in step 1106 the system would look up the quality metrics associated with communications between the originating and destination gateways. This would involve consulting the quality matrix discussed above. One or more quality values in the matrix relating to the first proposed route would be compared to a threshold value in step 1108. If the quality for the first route satisfies the threshold, the method would proceed to step 1110, and the route would be provided to the requesting gateway as a potential route for completion of a call.

If the result of comparison step 1108 indicates that the quality of service metrics for the first route do not satisfy the threshold, then in step 1112 the system would determine if this is the last available route for completing the call. If so, the method would proceed to step 1114, where the best of the available routes would be determined by comparing the quality metrics for each of the routes considered thus far. Then the method would proceed to step 1110, where the best available route would be provided to the requesting gateway.

If the result of step 1112 indicates that there are alternative routes available, the method would proceed to step 1116, where the quality metrics for the next available route would be compared to the threshold value. The method would then proceed to step 1108 to determine if the threshold is satisfied.

A method like the one illustrated in FIG. 11 could be used to identify multiple potential routes for completing a call that all satisfy a basic threshold level of service. The quality metrics associated with each route could then be used to rank the potential routes. Alternatively, the cost associated with each route could be used to rank all routes satisfying the minimum quality of service threshold. In still other alternative embodiments, a combination of cost and quality could be used to rank the potential routes. As explained above, the ranked list of potential routes could then be provided to the requesting gateway.

As also explained above, in providing a route to a gateway, the routing controller may specify either a direct route between the gateways, or a route that uses an interim gateway to relay data packets between an originating and destination gateway. Thus, the step of identifying a potential route in step 1104 could include identifying both direct routes, and indirect routes that pass through one or more interim gateways. When interim gateways are used, the quality metrics for the path between the originating gateway and the interim gateway and the path between the interim gateway and the destination gateway would all have to be considered and somehow combined in the comparison step.

In a system embodying the invention, as shown in FIG. 2, multiple different gateways are all routing calls using routing information provided by the routing controller 200. The routing information stored in the routing controller includes tables that are developed using the methods described above. The routing table indicates the best available routes between any two gateways that are connected to the system. Even when there are multiple routing controllers that are a part of the system, all routing controllers normally have the same routing table information. This means that each time a gateway asks for a route to a destination telephone number, the routing information returned to the gateway will be the same, regardless of which gateway made the routing request. As will be explained below, in prior art systems, the fact that all gateways receive the same routing information can lead to unnecessary signaling and looping of call setup requests.

Figure 12:
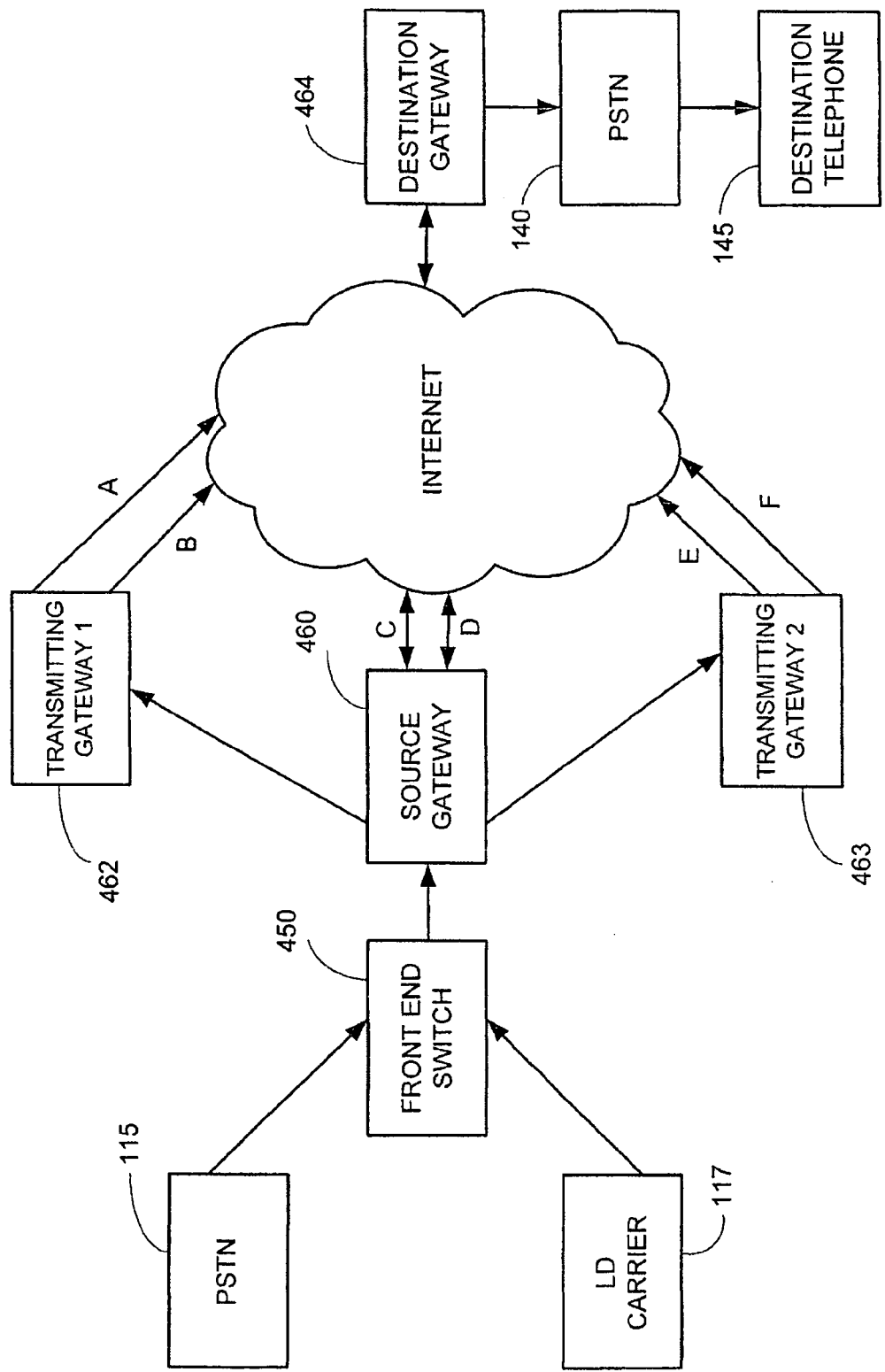
FIG. 12 is a schematic diagram of a system architecture for routing traffic over the Internet, according to a second embodiment of the present invention.

FIG. 12 shows the basic architecture of a system embodying the invention. As shown therein, the PSTN 115 and/or a long distance carrier 117 both deliver calls to a front end switch 450 of the system. The calls arrive at the front end switch 450 as a call set-up request to complete a call to the destination telephone 145. The front end switch 450 or the Source Gateway 460 can then consult a route controller, wherein the route controller determines the most optimal route and a gateway associated with the most optimal route, which can convert the call into digital data packets and place the packets on to the Internet properly addressed to the designation gateway 464. Additionally, a destination gateway may be chosen from a plurality of destination gateways depending on such criteria as, but not limited to, compatibility, dependability, and efficiency. The route controller ranks the routes from the most optimal to least optimal.

Once a route is identified, the call request would be formatted as digital data packets that include header data with routing information. For example the header can include information such as the originating gateway associated with the most optimal route, the destination gateway, and the destination telephone number. The Source Gateway 460 then attempts to complete the call to the destination gateway.

Each of the individual gateways can place data traffic onto the Internet using one or more routes or access points. In the system illustrated in FIG. 12, Source Gateway 460 can place traffic onto the Internet using route C or D. The First Transmitting Gateway 462 can place traffic on the Internet using routes A and B. The Second Transmitting Gateway 463 can place traffic onto the Internet using routes E and F. At any given point in time, one or more of these routes can become inoperative or simply degraded in performance to the point that making a voice call through the route results in poor call quality.

In prior art systems, when the front end switch 450 receives a call request for a call intended for the destination telephone 145 from either the PSTN 115 or the long distance carrier 117, the front end switch would forward the call to one of the gateways so that the call setup procedures could be carried out. For purposes of explanation, assume that the call request is forwarded to Source Gateway 460. The gateway would then make a routing request to the routing controller for information about the address of the destination gateway, and the most preferable route to use to get the data onto the Internet. Again, for purposes of explanation, assume that the routing controller responds with the address of the destination gateway 464, and with the information that the best routes, in preferred order, are routes C, then A, and then E.

With this information, Source Gateway 460 would first try to set the call up to go to the destination gateway 464 via route C. Assume that for whatever reason, route C fails. Source Gateway would then consult the routing information again and determine that the next best route is route A. Thus, Source Gateway would forward the call on to the First Transmitting Gateway 462, which is capable of using route A.

When the First Transmitting Gateway 462 receives the call request, it too will consult the routing controller for routing information. The same information will be returned to the First Transmitting Gateway 462, indicating that the preferred routes are C, then A, then E. With this information, the First Transmitting Gateway 462 believes that route C is the best route, so the First Transmitting Gateway 462 would bounce the call request back to Source Gateway 460, so that the call could be sent through route C. Source Gateway would receive back the same call request it just forwarded on to the First Transmitting Gateway 462. Depending on the intelligence of the Source Gateway, the Source Gateway might immediately send a message to the First Transmitting Gateway 462 indicating that route C has already been attempted and that this route failed. Alternatively, Source Gateway might again try to send the call via route C. Again the route would fail. Either way, the call request would ultimately be bounced back to the First Transmitting Gateway 462 with an indication that the call could not be sent through route C.

When the First Transmitting Gateway 462 gets the call request back from the Source Gateway, it would then consult its routing information and determine that the next route to try is route A. If route A is operable, the call could then be setup between the First Transmitting Gateway 462 and the destination gateway 464 via route A. Although this process eventually results in a successful call setup, there is unnecessary call signaling back and forth between the Source Gateway 460 and the First Transmitting Gateway 462.

Moreover, if the First Transmitting Gateway 462 is unable to set up the call through route A, the First Transmitting Gateway 462 would again consult the routing information it received earlier, and the First Transmitting Gateway 462 would send the call to the Second Transmitting Gateway 463 so that the call can be placed onto the Internet using route E. When the Second Transmitting Gateway 463 receives the call request from the First Transmitting Gateway 462, it too would consult the routing controller and learn that the preferred routes are route C, then route A, then route E. With this information, the Second Transmitting Gateway 463 would forward the call request back to the Source Gateway 460 with instructions to place the call through route C, which would fail again. The Source Gateway 460 would then forward the call back to the Second Transmitting Gateway 463. The Second Transmitting Gateway 463 would then try to complete that call using the First Transmitting Gateway 462 and route A. This too would fail. Finally, the Second Transmitting Gateway 463 would send the call out using route E.

Because each of the gateways are using the same routing information, when one or more routes fail, there can be a large amount of unnecessary looping and message traffic between the gateways as the a call request is passed back and forth between the gateways until the call is finally placed through an operative route. In preferred embodiments of the invention, special routing procedures are followed to reduce or eliminate unnecessary looping.

In preferred embodiments of the invention, if the call attempt fails, the call attempt returns to the Source Gateway 460. The Source Gateway 460 can then query the route controller for a second most optimal route. If the second most optimal route is located through First Transmitting Gateway 462, the route controller attaches a second set of header information identifying the new route to the data packets that comprise the call set up request. The new header information identifies the First Transmitting Gateway 462. The Source Gateway 460 then forwards the second call set-up request to the First Transmitting Gateway 462. The First Transmitting Gateway 462 is configured to strip off the portion of the header data which identifies itself. The First Transmitting Gateway 462 then sends the call setup request on to the Destination Gateway 464. If the second call attempt fails, the data packets are returned to the Source Gateway 460 because the header data identifying the First Transmitting Gateway 462 has been removed. It should be noted that any gateway can be the Source Gateway 460 as long as it is associated with the most optimal route. It should also be noted that any transmitting gateway may be configured to automatically strip off a portion of the header that identifies itself.

To be more specific, if the route controller determined that route C is the most optimal route, the translated header information inserted onto the data packets containing the call setup request would include an identification of the Source Gateway 460, because that is where the route is located, plus the destination gateway 464, plus the destination telephone number. The Source Gateway 460 then attempts the call setup by sending the data packets to the Destination Gateway 464. If the call attempt is successful, the call connection is completed. However, if the call attempt fails, for any reason, it is returned to the Source Gateway 460.

The gatekeeper then queries the route controller for a second most optimal route. For example, in FIG. 12, the second most optimal route may be route A, which is located through the First Transmitting Gateway 462. The Source Gateway 460 would then insert new header information, consisting of the identification of the First Transmitting Gateway 462 in front of the existing header information. The Source Gateway 460 then forwards the call set-up request, with the new header information, to the First Transmitting Gateway 462. The First Transmitting Gateway 462 reads the header information and discovers that the first part of the header information is its own address. The First Transmitting Gateway 462 will then strip off its own identification portion of the header. The First Transmitting Gateway 462 then attempts a call setup to the destination gateway 464. If the second call attempt fails, the destination gateway 464 returns the call attempt to the Source Gateway 460, because the remaining portion of the header only identifies the Source Gateway 460. Thus, rather than bouncing the call attempt back to the First Transmitting Gateway 462, the failed call attempt would simply return to the Source Gateway 460, which tracks route failure and remaining optimal route information. This method can eliminate or reduce unnecessary looping.

In a second embodiment, each of the gateways will know which routes are associated with each gateway. Alternatively, this information may be provided by the routing controller as needed. This means that the First Transmitting Gateway 462 would know that the Source Gateway 460 uses routes C and D, and that the Second Transmitting Gateway 463 uses routes E and F. The gateways can then use this information to reduce or eliminate unnecessary looping.

For instance, using the same example as described above, when a call request comes in to place a call to destination telephone 145, the Source Gateway 460 would first try to send the call via route C. When that route fails, the Source Gateway 460 would send the call request to the First Transmitting Gateway 462 so that the First Transmitting Gateway 462 could send the call via route A. In the prior art system, the First Transmitting Gateway 462 would have bounced the call request back to the Source Gateway 460 because the First Transmitting Gateway 462 would believe that route C is the best way to route that call. But in a system embodying the invention, the First Transmitting Gateway 462 would know that the Source Gateway 460 uses route C. With this knowledge, and knowing that the call request came from the Source Gateway 460, the First Transmitting Gateway 462 would conclude that the Source Gateway 460 must have already tried to use route C, and that route C must have failed. Thus, rather than bouncing the call request back to the Source Gateway 460, the First Transmitting Gateway 462 would simply try the next best route, which would be route A. Similar logic can be used at each of the other gateways to eliminate unnecessary looping.

In another preferred embodiment, special addressing information can be included in the messages passing back and forth between the gateways. For instance, and again with reference to the same example described above, assume that the Source Gateway 460 first gets a call request to complete a call to destination telephone 145. The Source Gateway 460 would try to send the call via route C, and route C would fail. At this point, the Source Gateway 460 would know that the next best route is route A. In this embodiment, before sending the call request on to the First Transmitting Gateway 462, the Source Gateway 460 could encode a special addressing message into the call request. The special addressing message would inform the First Transmitting Gateway 462 that the call request should be sent via a specific route. In the example, the Source Gateway 460 would include addressing codes that indicate that the call request should be sent via route A, since that is the next best route.

When the First Transmitting Gateway 462 receives the call request, it would read the special routing information and immediately know that the call should be sent via route A. If route A is operable, the call will immediately be sent out using route A. If route A is not available, the First Transmitting Gateway 462 would consult the routing controller and determine that the next route to try is route E. The First Transmitting Gateway 462 would then send the call request on to the Second Transmitting Gateway 463 with special addressing information that tells the Second Transmitting Gateway 463 to immediately try to place the call using route E. In this manner, unnecessary looping can be eliminated.

When calls are routed over an Internet protocol telephone system, there is a possibility that certain trunk groups and/or destination gateways may be used more often than others. The routing control system tends to favor trunk groups/destination gateways that can offer the lowest costs to complete a call to the called party. In addition, some trunk groups/destination gateways may offer consistently high call quality, while others in the same area do not. As a result, the routing engine may drive a large amount of calls to certain trunk groups and/or destination gateways, with the result that the favored trunk groups/destination gateways become overloaded.

In the following description, a load balancing system will be described. The load balancing system helps to balance the load of call traffic across various trunk groups. Information about call traffic is available to the trunk group level, thus, control is asserted at this level.

Typically, one or more destination gateways would be served by a single trunk group. In some situations, a single destination gateway could be connected to multiple trunk groups. Thus, a load balancing system which acts at the trunk group level would also have the effect of balancing the call traffic between all available destination gateways. However, if information about call traffic were available to the level of individual destination gateways, it would also be possible to have the load balancing system exert control at this level. Thus, although the following description assumes that call traffic is monitored at a trunk group level, a load balancing system could also be developed to control and balance call traffic between individual destination gateways.

Once a trunk group approaches its capacity, or hits its maximum capacity, several problems can arise. The most common problem is that when additional call requests come in for calls to be routed to the location served by that trunk group, the routing engine instructs the originating gateways to drive the additional traffic to the overloaded trunk group and its destination gateway. When the new call setup attempts are made, the destination gateways refuse the additional calls, and the originating gateways must often go back to the routing engine to obtain an alternate route. This process eats up valuable time. Because there are call setup time limits, if too much time expires before the call is actually connected, the call will be terminated, and the call is lost. This obviously results in lost revenue.

In addition, there is a possibility that existing calls carried by an overloaded trunk group or gateway will have degraded call quality, or might even be terminated because of the extremely high data traffic being carried by the trunk group/gateway. Poor call quality can cause callers to seek alternative ways of placing calls in the future. Likewise, a call that is dropped will also result in customer dissatisfaction and lost revenue. All of these problems should be avoided if possible.

Figure 13:
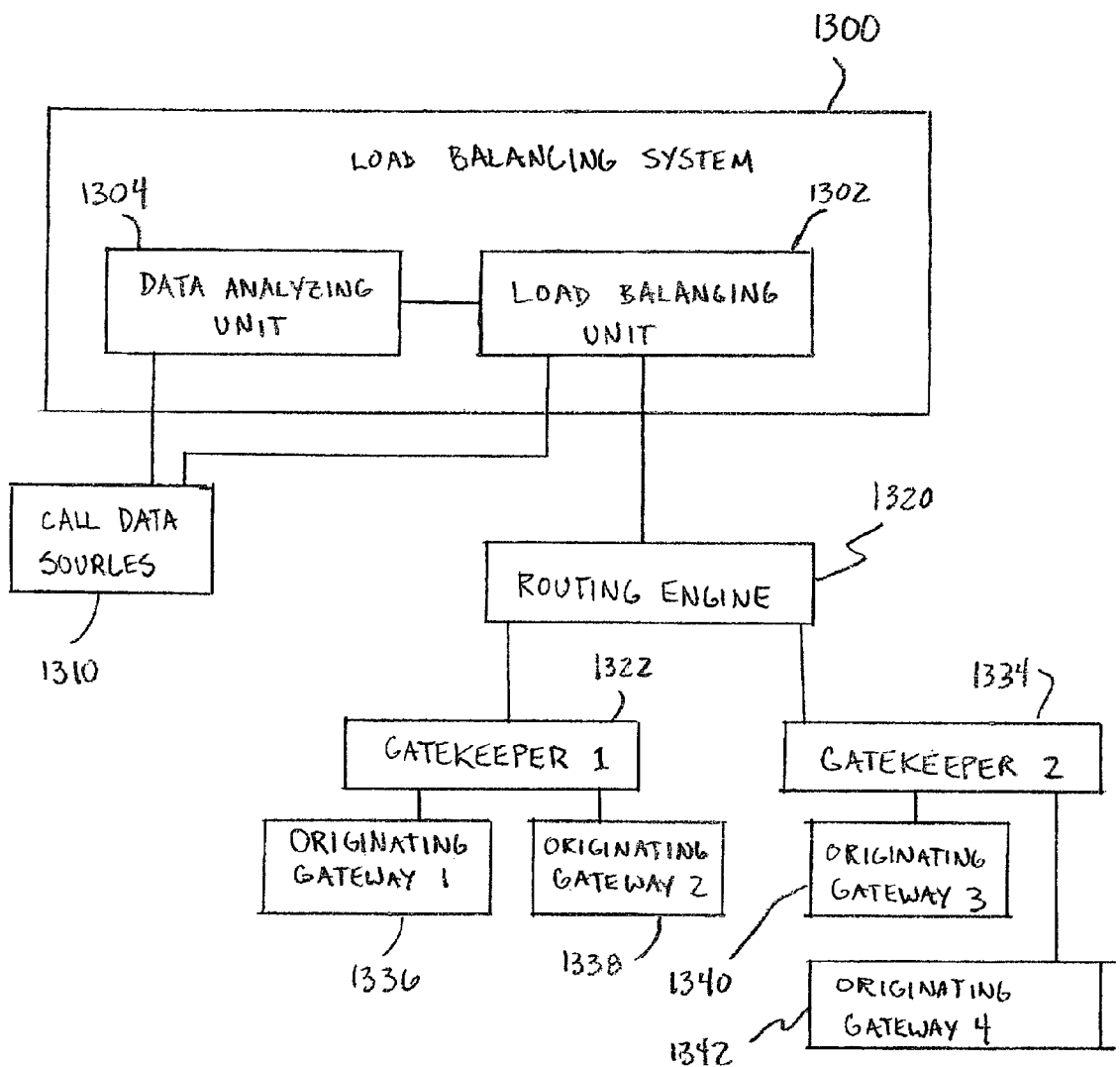
FIG. 13 is a block diagram showing elements of a gateway load balancing system embodying the invention.

A load balancing system embodying the invention and designed to overcome these problems is illustrated in FIG. 13. This system is designed to monitor the traffic carried through individual trunk groups. If the traffic carried by any one trunk group approaches the maximum capacity of that trunk group, the system takes steps to re-route additional calls through alternate trunk groups. This ensures that no trunk group/destination gateway becomes overloaded, which avoids the problems mentioned above.

The load balancing system 1300 shown in FIG. 13 includes a data analyzing unit 1304 and a load balancing unit 1302. The data analyzing unit obtains information about the calls presently being carried by the system, including both active calls, and those in the setup stage. This call information comes from call data sources 1310. The call data sources 1310 could include the routing engine and its call state library, a traffic database, a traffic analysis engine, a radius server, or a call detail records database. Ideally, this information will include the "core count," which provides information about all calls in the setup state or the connected state. This information could also include information about call declines, hang-ups, voice quality on certain routes and through certain destination gateways and the costs of completing calls through the destination gateways. The call information could also include the average call duration for calls placed to particular locations, or though particular destination gateways. This additional information could also be accessed through various system databases and recording systems.

Based on the information obtained from these various sources, the data analyzing unit 1304 would determine how many calls are being carried through each trunk group. This information would be compared to the known capacities of the trunk group, or to all of the destination gateways served by a trunk group, to determine if a particular trunk group is approaching its maximum capacity.

The known capacities of the trunk groups and/or destination gateways can be determined in various ways. In some instances, the known equipment types may give the system some idea of its capacity. However, real world testing may be required to determine a particular trunk group or destination gateway's limits. For instance, during a testing phase, the system might send a gradually increasing volume of calls to a particular trunk group, and then note when the trunk group reaches capacity. This would typically mean, when the destination gateways served by the trunk group refuse additional call setup requests. After this testing has been performed, the system would never send more than the known maximum call volume to that trunk group.

Basically, the load balancing system 1300 constantly monitors the traffic conditions in real time, and it runs through certain calculations using the real time data. The results of those calculations are compared to predetermined threshold values. If a threshold value is exceeded, then the load balancing system will act to better balance the call load across system resources.

In addition, there may be limits on how quickly a destination gateway connected to a trunk group can handle a call setup request. Further, the speed at which the destination gateways can handle a setup request may vary depending on the number of calls already being handled by the gateways. In real world terms, this means that a particular trunk group may be able to quickly receive and setup a certain number of calls, but that once that call volume is reached, additional calls can only be added to the trunk group at a slower rate. For this reason, it may be necessary for the system to limit the rate at which additional calls are sent to a particular trunk group. Here again, testing the trunk groups and/or destination gateways may be necessary to determine how quickly to add additional call volume to a particular trunk group.

For instance, testing of a trunk group may indicate that a particular trunk group can very rapidly accept and setup the first twenty calls, but that when more than twenty simultaneous calls are in progress, additional calls must be slowly added to avoid a call setup rejection. Once testing has established this limit, the system would ensure that once twenty calls are being handled, additional calls are only added at a relatively slow rate. If there are too many new calls going to the destination served by that trunk group, the additional calls will be routed to alternate trunk groups serving the same destination.

Further, the fact that testing has established certain call capacity and call setup speed limits for a particular type of equipment on one trunk group does not mean that the same equipment will have the same limits when employed in a different physical location. Various other factors including the Internet service provider, physical wiring limitations and other factors could also affect a trunk group's ability to handle and setup calls. For this reason, it may be necessary to test each individual trunk group to determine its actual real world limits.

In alternate embodiments of the invention, the data analyzing unit 1304 might receive signals directly from the destination gateways indicating that they are approaching or are at their maximum capacity. This method of tracking the capacity of the destination gateways might be easier to accomplish, but it would require that all the destination gateways be configured to self monitor, and to send signals as necessary back to the load balancing system 1300.

In addition, it might only be necessary to monitor a subset of all existing trunk groups. For instance, if historical data indicates that only 15% of all trunk groups ever become overloaded, it would make sense for the load balancing system 1300 to only spend its assets monitoring those trunks. Thus, the load balancing system might utilize the call information obtained by the data analyzing unit 1304 to identify the trunk groups that require monitoring and control.

Regardless of how it actually occurs, once the data analyzing unit 1304 identifies a trunk group that is overloaded, or that is in danger of becoming overloaded, the load balancing unit 1302 will take steps to correct the problem. This action will usually be in the form of a communication sent to the routing engine instructing the routing engine to stop sending call setup requests to the overloaded trunk group, or to at least reduce the number of setup requests being sent to that trunk group. This, in turn, will reduce traffic being carried by the overloaded trunk group, to avoid all the above-noted problems. In most cases, there will be other trunk groups serving the same destination as the overloaded trunk group, which will allow additional calls to be carried through alternate trunk groups. In other words, it should be possible to complete all calls, even without the use of the overloaded trunk group.

The load balancing unit 1302 could act to reduce traffic at the overloaded trunk groups in many different ways. For instance, the load balancing unit could instruct the routing engine to stop sending any additional calls to the destination gateways served by the overloaded trunk group for a specified delay period of time. With no additional calls to carry, and with the existing calls terminating over time, this sort of control will result in the destination gateways served by the trunk group gradually carrying less and less traffic. The delay period specified by the load balancing unit could be the same for all trunk groups/destination gateways, or it could vary depending on the trunk groups/destination gateways at issue, the existing traffic conditions, the time of day, the time of week, or a variety of other conditions.

In another control scheme, the load balancing unit could instruct the routing engine to only send a specified percentage of all calls going to a particular geographical location through the destination gateways served by the overloaded trunk group. For instance, the load balancing unit 1302 might instruct the routing engine to send only 50% of future calls going to the location served by the overloaded trunk group through the destination gateways served by that overloaded trunk group. This will force the routing engine to send the other 50% through alternate destination gateways served by other trunk groups. In a similar manner, the load balancing unit might instruct the routing engine to send every $3^{rd}$ call going to the destination served by the overloaded trunk group through destination gateways served by alternate trunk groups. Although implemented in a slightly different manner, this will have the same basic effect as specifying a percentage of calls to be re-directed elsewhere.

In still other embodiments of the invention, the load balancing unit might attempt to take other information into account before providing instructions to the routing engine. For instance, the load balancing unit 1302 might consider the call quality offered by each of the destination gateways. If a destination gateway served by an overloaded trunk group offers high call quality, the load balancing unit might instruct the routing engine to divert all calls that do not require high call quality to destination gateways served by an alternate trunk group, while allowing the routing engine to continue to send calls requiring high call quality to the destination gateways served by the overloaded trunk group. The diversion of the low quality calls will unburden the overloaded trunk group, and those calls requiring high call quality will still be routed through the destination gateway offering high call quality such that the high quality is provided.

Likewise, the load balancing unit might take cost into consideration. For instance, if the destination gateways served by an overloaded trunk group are capable of completing calls at a very low cost, which is common since large volumes of traffic are often driven to such gateways, the load balancing unit can send instructions to the routing engine that are cost sensitive. The load balancing unit might instruct the routing engine to divert calls which will support more than a threshold payment per minute to destination gateways served by an alternate trunk group, while allowing the routing engine to continue routing calls that will support only less than the threshold charge per minute through the gateways served by the overloaded trunk group. This will ensure that those calls that must be completed for the minimum amount can still be carried profitably through the overloaded trunk group/gateways, while also allowing other calls to be completed through alternate destination gateways, albeit at a slightly lower profit margin. The tradeoff for accepting the slightly lower profit margin would be that all potential calls will be completed, and there will be less likelihood of poor quality calls or dropped calls, which could cause customer dissatisfaction.

Figure 14:
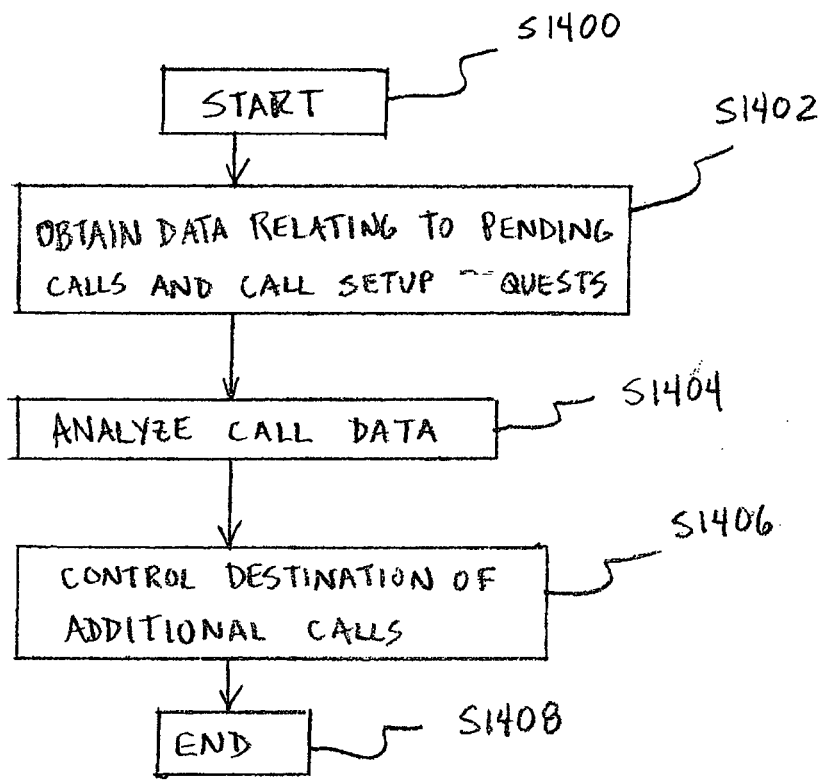
FIG. 14 is a schematic flow diagram of a method for controlling the load of calls carried by a voice over internet protocol telephone system, according to an exemplary embodiment of the present invention.

FIG. 14 shows a schematic flow diagram of a first generalized method embodying the invention for controlling the load of calls carried by a voice over Internet protocol telephone system. The method begins in step S1400, and proceeds to step S1402 where data relating to pending calls and calls in the setup state is acquired. In step S1404, the call data is analyzed to determine if a particular trunk group and/or destination gateways are overloaded. If some trunk groups/destination gateways are overloaded, in step S1406, signals are sent to control how additional calls are routed so that the overloaded trunk groups/gateways do not receive more call setup requests. The method then ends at step S1408.

As explained above, the step of obtaining data can be accomplished in many different ways, and the data can come from many different sources. As also explained above, the step of analyzing the data can take many different forms, depending on the types of data being analyzed, and the sources of the data. Nevertheless, after these two steps have been accomplished it should be clear which trunk groups/destination gateways are getting overloaded.

Likewise, the step of controlling the destination of additional calls could be accomplished in many ways. But once the step has been accomplished, the result should be fewer calls placed through the overloaded trunk groups/gateways.

Systems and methods embodying the invention could be implemented through various software modules that interact with other portions of a voice over Internet protocol system for carrying telephone calls. Such software could run continuously to monitor the status of the trunk groups/destination gateways to prevent or alleviate overcapacity conditions at the trunk groups/destination gateways.

Figure 15:
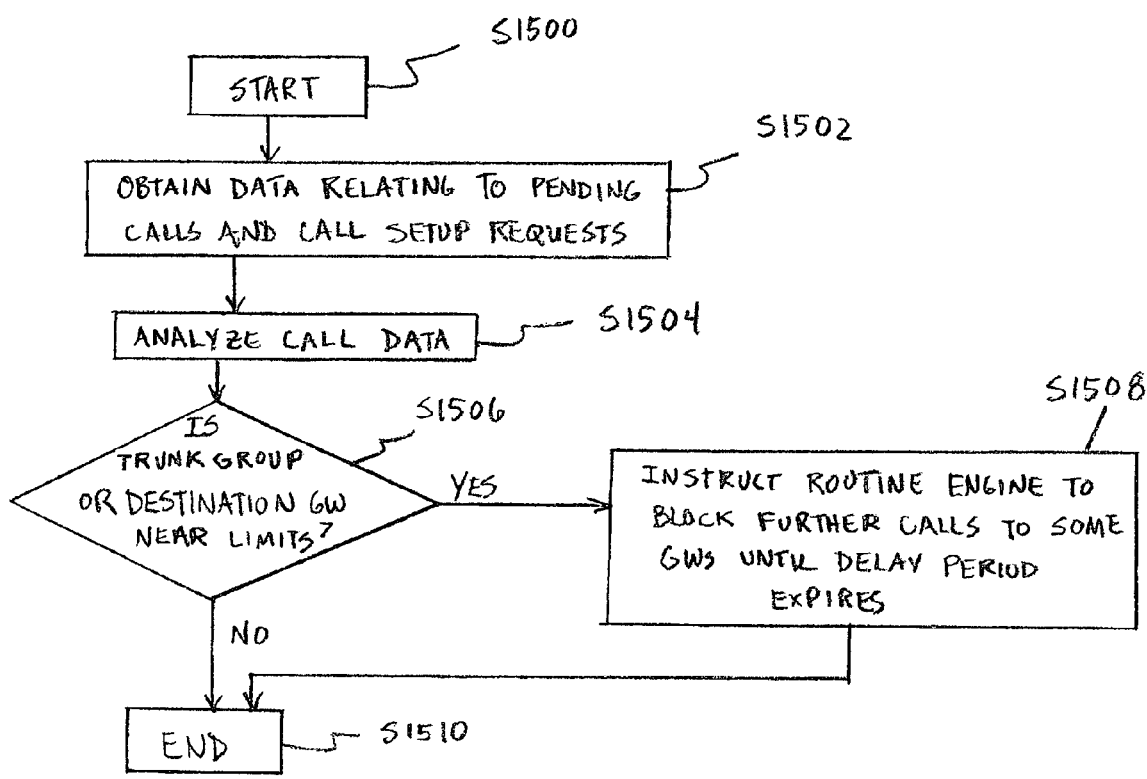
FIG. 15 is a schematic flow diagram of another method for controlling the load of calls, according to an exemplary embodiment of the present invention.

FIG. 15 shows a diagram of another method embodying the invention for controlling traffic on a VoIP system. The method begins at step S1500 and continues to step S1502 where data relating to pending calls and call setup requests is obtained. In step S1504, the call data is analyzed. In step S1506, the method determines, based on the collected and analyzed call data, if a trunk group or a destination gateway is approaching it capacity limits. If not, the method ends in step S1510. However, if a trunk group or a destination gateway is approaching its capacity limits, the method continues to step S1508, where the method instructs the routing engine to block further calls to the destination gateways served by the overloaded trunk group until a delay period expires. As explained above, this allows the traffic carried by the overloaded trunk group/destination gateway to be reduced. The method would then end in step S1510.

Figure 16:
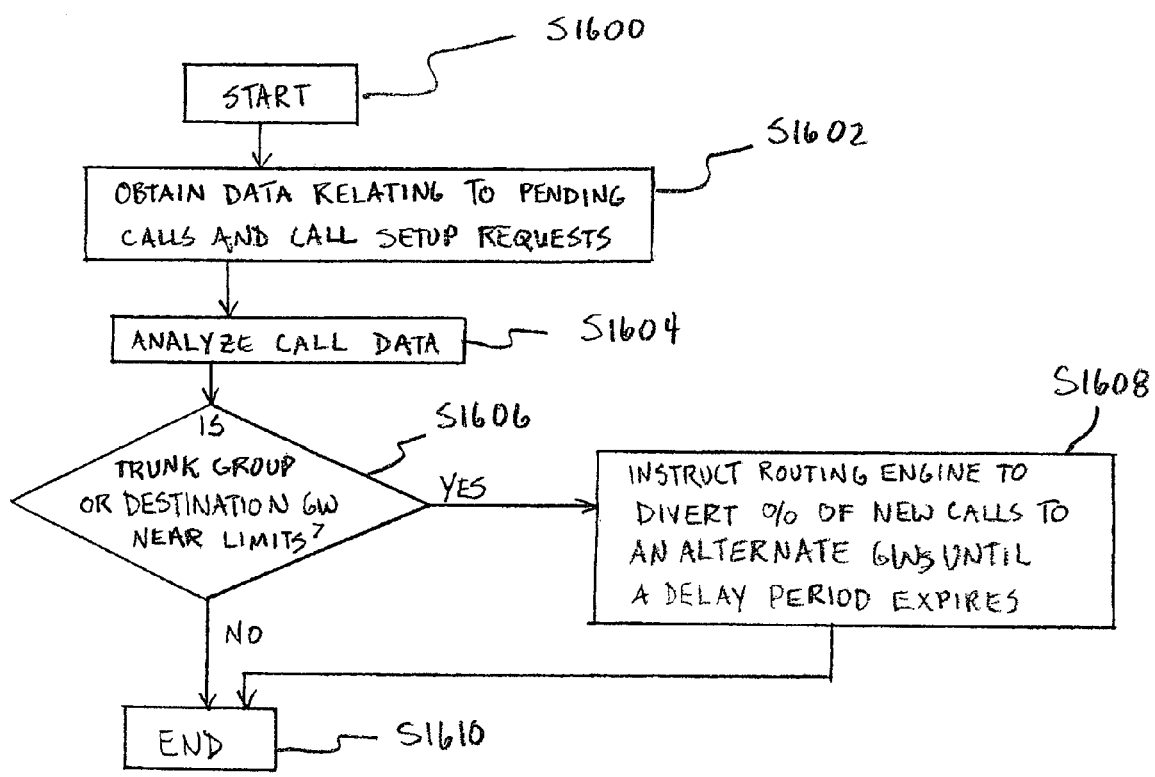
FIG. 16 is a schematic flow diagram of yet another method for controlling the load of calls, according to another exemplary embodiment of the present invention.

FIG. 16 shows a diagram of another method embodying the invention for controlling traffic on a VoIP system. The method begins at step S1600 and continues to step S1602 where data relating to pending calls and call setup requests is obtained. In step S1604, the call data is analyzed. In step S1606, the method determines, based on the collected and analyzed call data, if a trunk group of a destination gateway is approaching it capacity limits. If not, the method ends in step S1610. However, if a trunk group or a destination gateway is approaching its capacity limits, the method continues to step S1608, where the method instructs the routing engine to divert a percentage of new calls to alternate destination gateways until a delay period expires. As explained above, this allows the traffic carried by the overloaded trunk group or destination gateway to be reduced. The method would then end in step S1610.

Figure 17:
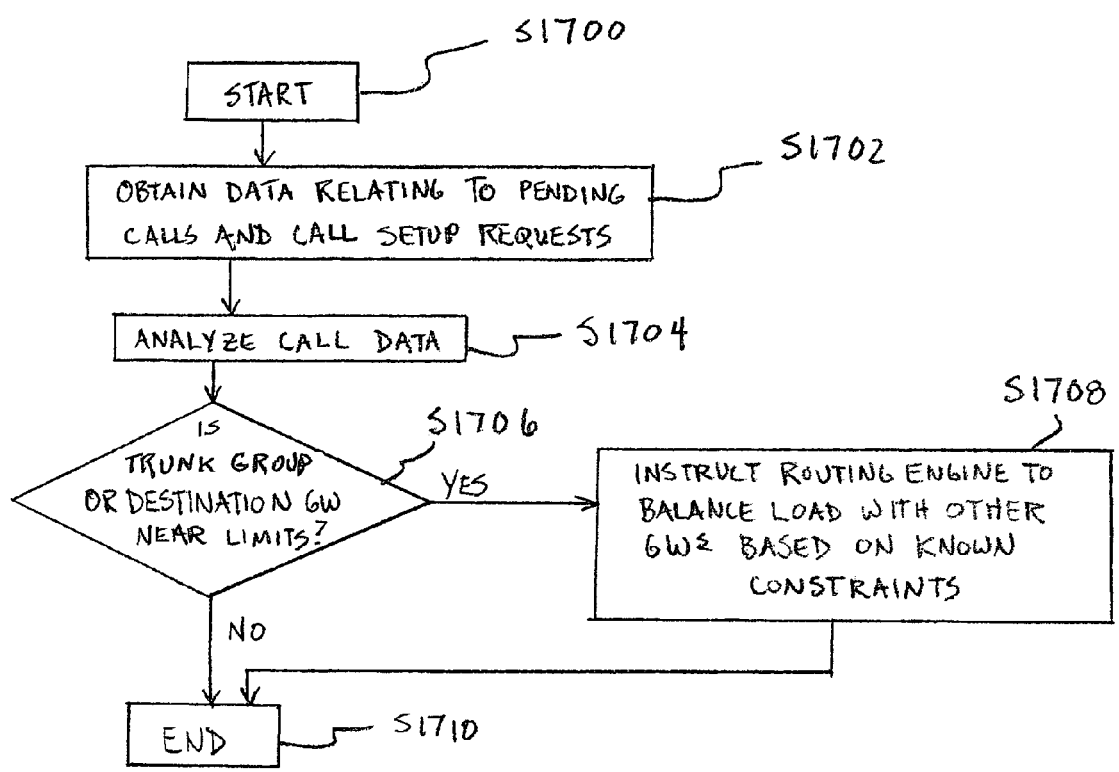
FIG. 17 is a schematic flow diagram of still another method for controlling the load of calls, according to yet another exemplary embodiment of the present invention.

FIG. 17 shows a diagram of yet another method embodying the invention for controlling traffic on a VoIP system. The method begins at step S1700 and continues to step S1702 where data relating to pending calls and call setup requests is obtained. In step S1704, the call data is analyzed. In step S1706, the method determines, based on the collected and analyzed call data, if a trunk group or a destination gateway is approaching it capacity limits. If not, the method ends in step S1710. However, if a trunk group or a destination gateway is approaching its capacity limits, the method continues to step S1708, where the method instructs the routing engine to balance the call load with other trunk groups or destination gateways based on known constraints. As explained above, this could mean continuing to send calls requiring a high call quality to an overloaded trunk group or gateway, while diverting calls requiring a lesser call quality to other trunk groups or destination gateways. It could also mean continuing to send calls requiring a very low cost routing to the overloaded trunk group or destination gateway, while diverting other calls to alternate trunk groups or destination gateways. Of course, those skilled in the art would appreciate that other methods of balancing the call load based on other known constraints could also be used. The method would then end in step S1610.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling the load of calls carried by a voice over Internet protocol telephone system, comprising:
experimentally determining a first destination gateway's call carrying capacity, wherein the call carrying capacity includes the number of calls that can be simultaneously handled by the first destination gateway;
obtaining, with a controller, call information relating to a plurality of calls that are presently being carried by the voice over Internet protocol telephone system, wherein the obtaining step comprises determining the number of calls presently being carried by the first destination gateway that are in a connected or setup state;
analyzing the obtained information to determine if the first destination gateway is at or near its experimentally determined call carrying capacity; and
controlling the routing of additional new calls before they are connected to the first destination gateway, such that at least some new calls are routed to destination gateways other than the first destination gateway to reduce the call load on the first destination gateway if the first destination gateway is at or near its previously determined call carrying capacity, wherein when the analyzing step indicates that the first destination gateway is at or near its call carrying capacity, the controlling step comprises causing additional new calls that could have been completed through the first destination gateway to be completed through destination gateways other than the first destination gateway for a predetermined period of time;

wherein when the analyzing step indicates that the first destination gateway, which provides high call quality, is at or near its call carrying capacity, the controlling step comprises causing additional new calls that could have been completed through the first destination gateway and that do not require high call quality to be completed through destination gateways other than the first destination gateway for a predetermined period of time.

2. The method of claim 1, wherein the obtaining step comprises obtaining information about call traffic for a plurality of individual destination gateways, and wherein the analyzing and controlling steps are performed for the plurality of individual destination gateways.

3. A method of controlling the load of calls carried by a voice over Internet protocol telephone system, comprising:
experimentally determining a first destination gateway's call carrying capacity, wherein the call carrying capacity includes the number of calls that can be simultaneously handled by the first destination gateway;
obtaining, with a controller, call information relating to a plurality of calls that are presently being carried by the voice over Internet protocol telephone system, wherein the obtaining step comprises determining the number of calls presently being carried by the first destination gateway that are in a connected or setup state;
analyzing the obtained information to determine if the first destination gateway is at or near its experimentally determined call carrying capacity; and
controlling the routine of additional new calls before they are connected to the first destination gateway, such that at least some new calls are routed to destination gateways other than the first destination gateway to reduce the call load on the first destination gateway if the first destination gateway is at or near its previously determined call carrying capacity, wherein when the analyzing step indicates that the first destination gateway is at or near its call carrying capacity, the controlling step comprises causing additional new calls that could have been completed through the first destination gateway to be completed through destination gateways other than the first destination gateway for a predetermined period of time;
wherein when the analyzing step indicates that the first destination gateway, which can complete calls for a low cost, is at or near its call carrying capacity, the controlling step comprises causing some new additional calls that could have been completed through the first destination gateway and that do not have to be completed for a low cost to be completed through destination gateways other than the first destination gateway for a predetermined period of time.

4. A method of controlling the load of calls carried by a voice over Internet protocol telephone system, comprising:
obtaining, with a controller, call information relating to a plurality of calls that are presently being carried by the voice over Internet protocol telephone system, wherein the obtaining step comprises obtaining information about the number of calls that are in the connected and the setup state for individual trunk groups;
analyzing the obtained information to determine if a trunk group is at or near its call carrying capacity; and
controlling the routing of additional new calls to reduce the call load on any overloaded or nearly overloaded trunk groups, wherein when the analyzing step indicates that a first trunk group that provides high call quality is at or near its call carrying capacity, the controlling step comprises causing some additional new calls that could have been completed through the first trunk group and that do not require high call quality to be completed through trunk groups other than the first trunk group for a predetermined period of time.

5. The method of claim 4, further comprising experimentally determining the first trunk group's call carrying capacity, wherein the analyzing step comprises determining if the first trunk group is at or near its experimentally determined call carrying capacity.

6. A method of controlling the load of calls carried by a voice over Internet protocol telephone system, comprising:
obtaining, with a controller, call information relating to a plurality of calls that are presently being carried by the voice over Internet protocol telephone system, wherein the obtaining step comprises obtaining information about the number of calls that are in the connected and the setup state for individual trunk groups;
analyzing the obtained information to determine if a trunk group is at or near its call carrying capacity; and
controlling the routing of additional new calls to reduce the call load on any overloaded or nearly overloaded trunk groups, wherein when the analyzing step indicates that a first trunk group that can complete calls for a low cost is at or near its call carrying capacity, the controlling step comprises causing some new additional calls that could have been completed through the first trunk group and that do not have to be completed for a low cost to be completed through trunk groups other than the first trunk group for a predetermined period of time.

7. A system for controlling the load of calls carried by a voice over Internet protocol telephone system, comprising:
means for obtaining call information relating to a plurality of calls carried by the voice over Internet protocol telephone system, wherein the obtaining means determines the number of calls that are either in the connected or the call setup state for at least one of a destination gateway and a trunk group;
means for experimentally determining the call carrying capacity of a trunk group or a destination gateway
means for analyzing the obtained information to determine if a trunk group or a destination gateway is at or near its call carrying capacity; and
means for controlling the routing of additional calls to reduce the call load on any trunk groups and destination gateways that are at or near their call carrying capacity by ensuring that at least some new calls are not routed through a trunk group or destination gateway that is at or near its call carrying capacity and are instead routed through trunk groups and destination gateways that are not at or near their call carrying capacity, wherein when the analyzing means indicates that a first trunk group or a first destination gateway is at or near its call carrying capacity, the controlling means causes additional new calls to be completed through trunk groups or destination gateways other than the first trunk group or first destination gateway for a predetermined period of time.

8. The system of claim 7, wherein when the analyzing means indicates that a first trunk group that provides high call quality is at or near its call carrying capacity, the controlling means causes some additional new calls that could have been completed through the first trunk group and that do not require high call quality to be completed through trunk groups other than the first trunk group for a predetermined period of time.

9. The system of claim 7, wherein when the analyzing means indicates that a first trunk group that can complete calls for a low cost is at or near its call carrying capacity, the controlling means causes some additional new calls that could have been completed through the first trunk group and that do not need to be completed for a low cost to be completed through trunk groups other than the first trunk group for a predetermined period of time.

10. The method of claim 1, wherein when the analyzing step indicates that the first destination gateway is nearing its call carrying capacity, a new call admission rate that is indicative of the number of new calls that are completed through the first destination gateway per unit of time is kept below a predetermined threshold level.

11. The method of claim 1, wherein the obtaining step comprises obtaining call information relating to a plurality of calls that are presently being carried by a subset of all of the destination gateways that can be used by the system to complete telephone calls.

12. The method of claim 11, wherein the subset of all of the destination gateways comprises only those destination gateways that typically become overloaded.

13. The method of claim 4, wherein when the analyzing step indicates that the first trunk group is nearing its call carrying capacity, a new call admission rate that is indicative of the number of new calls that are completed through the first trunk group per unit of time is kept below a predetermined threshold level.

14. The method of claim 4, wherein the obtaining step comprises obtaining call information relating to a plurality of calls that are presently being carried by a subset of all of the trunk groups that can be used by the system to complete telephone calls.

15. The method of claim 14, wherein the subset of all of the trunk groups comprises only those trunk groups that typically become overloaded.

16. The system of claim 7, wherein the analyzing means determines if a trunk group or a destination gateway is at or near its experimentally determined call carrying capacity.

17. The system of claim 7, wherein then the analyzing means indicates that a destination gateway that provides high call quality is at or near its call carrying capacity, the controlling means causes some additional new calls that could have been completed through the first destination gateway and that do not require high call quality to be completed through destination gateways other than the first destination gateways for a predetermined period of time.

18. The system of claim 7, wherein when the analyzing means indicates that a destination gateway that can complete calls for a low cost is at or near its call carrying capacity, the controlling means causes some additional new calls that could have been completed through the first destination gateway and that do not need to be completed for a low cost to be completed through destination gateways other than the first destination gateways for a predetermined period of time.

19. The method of claim 1, wherein the step of experimentally determining the first destination gateway's call carrying capacity comprises statistically analyzing call data for calls routed through the first destination gateway.

20. The method of claim 5, wherein the step of experimentally determining the first trunk group's call carrying capacity comprises statistically analyzing call data for calls routed through the first trunk group.

21. A method of controlling the load of calls carried by a voice over Internet protocol telephone system, comprising:
experimentally determining a trunk group's call carrying capacity;
obtaining, with a controller, call information relating to a plurality of calls that are presently being carried by the trunk group;
analyzing the obtained information to determine if the trunk group is at or near is experimentally determined call carrying capacity; and
controlling the routing of additional new calls to reduce the call load on the trunk group if the trunk group is at or near its experimentally determined call carrying capacity, wherein the obtaining step comprises obtaining call information relating to a plurality of calls that are presently being carried by a subset of all of the trunk groups that can be used by the system to complete telephone calls, and wherein the subset of all of the trunk groups comprises only those trunk groups that typically become overloaded.

22. A method of controlling the load of calls carried by a voice over Internet protocol telephone system, comprising:
experimentally determining a first destination gateway's call carrying capacity, wherein the call carrying capacity includes the number of calls that can be simultaneously handled by the first destination gateway;
obtaining, with a controller, call information relating to a plurality of calls that are presently being carried by the voice over Internet protocol telephone system, wherein the obtaining step comprises determining the number of calls presently being carried by the first destination gateway that are in a connected or setup state;
analyzing the obtained information to determine if the first destination gateway is at or near its experimentally determined call carrying capacity; and
controlling the routing of additional new calls before they are connected to the first destination gateway, such that at least some new calls are routed to destination gateways other than the first destination gateway to reduce the call load on the first destination gateway if the first destination gateway is at or near its previously determined call carrying capacity, wherein when the analyzing step indicates that the first destination gateway is at or near its call carrying capacity, the controlling step comprises causing additional new calls that could have been completed through the first destination gateway to be completed through destination gateways other than the first destination gateway for a predetermined period of time;
wherein the obtaining step comprises obtaining call information relating to a plurality of calls that are presently being carried by a subset of all of the destination gateways that can be used by the system to complete telephone calls, and wherein the subset of all of the destination gateways comprises only those destination gateways that typically become overloaded.

23. The method of claim 3, wherein the obtaining step comprises obtaining call information relating to a plurality of calls that are presently being carried by a subset of all of the destination gateways that can be used by the system to complete telephone calls, and wherein the subset of all of the destination gateways comprises only those destination gateways that typically become overloaded.

\* \* \* \* \*